Figure 1:
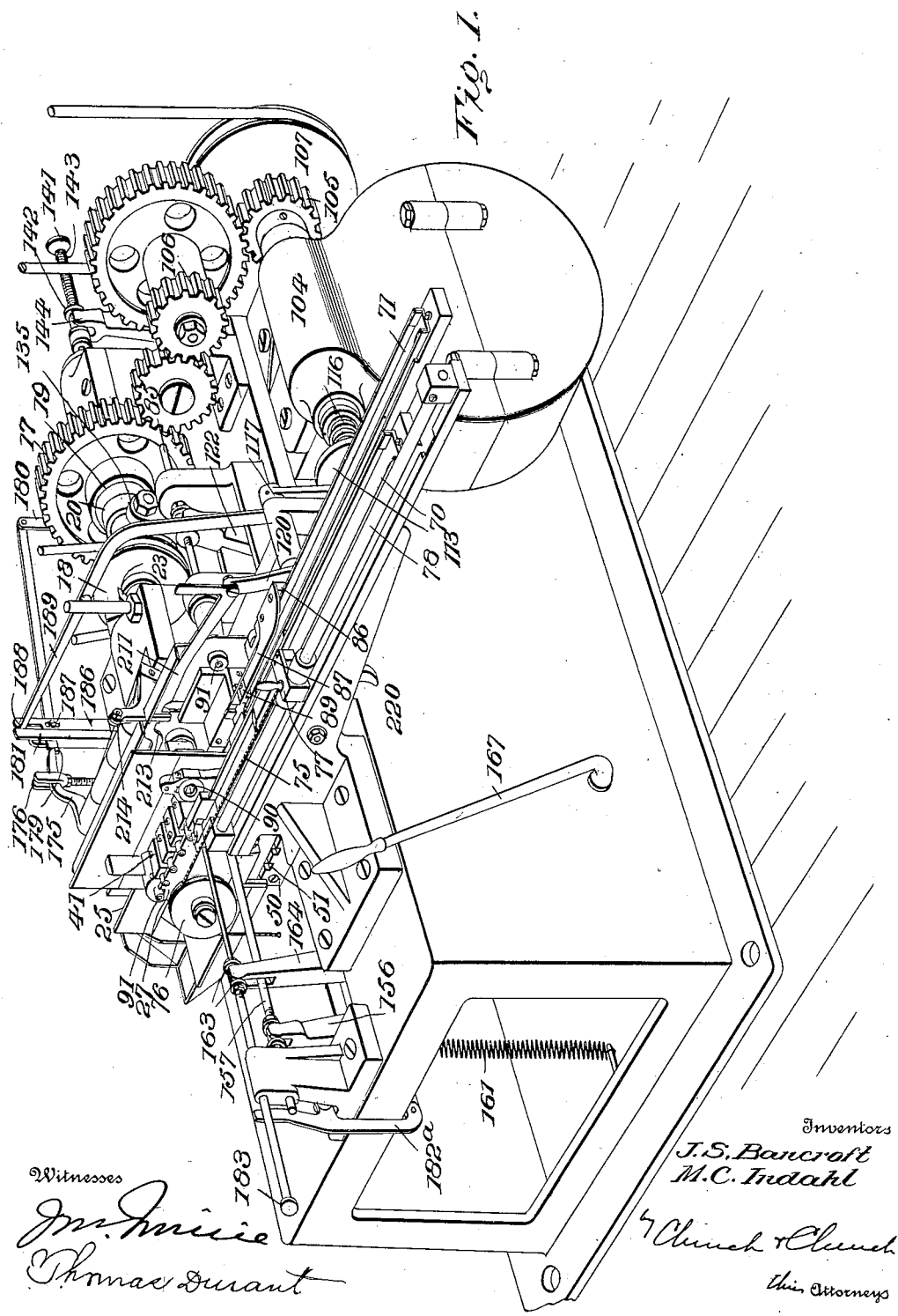

J. S. BANCROFT & M. C. INDAHL.
MATRIX CONEHOLING MACHINE.
APPLICATION FILED JAN. 21, 1910.

1,094,622.

Patented Apr. 28, 1914.
18 SHEETS—SHEET 1.

Witnesses

Inventors
J. S. Bancroft
M. C. Indahl their Attorneys

J. S. BANCROFT & M. C. INDAHL.
MATRIX CONEHOLING MACHINE.
APPLICATION FILED JAN. 21, 1910.

1,094,622.

Patented Apr. 28, 1914.
18 SHEETS—SHEET 6.

Witnesses

Inventors
J. S. Bancroft
M. C. Indahl
By Church & Church
Their Attorneys

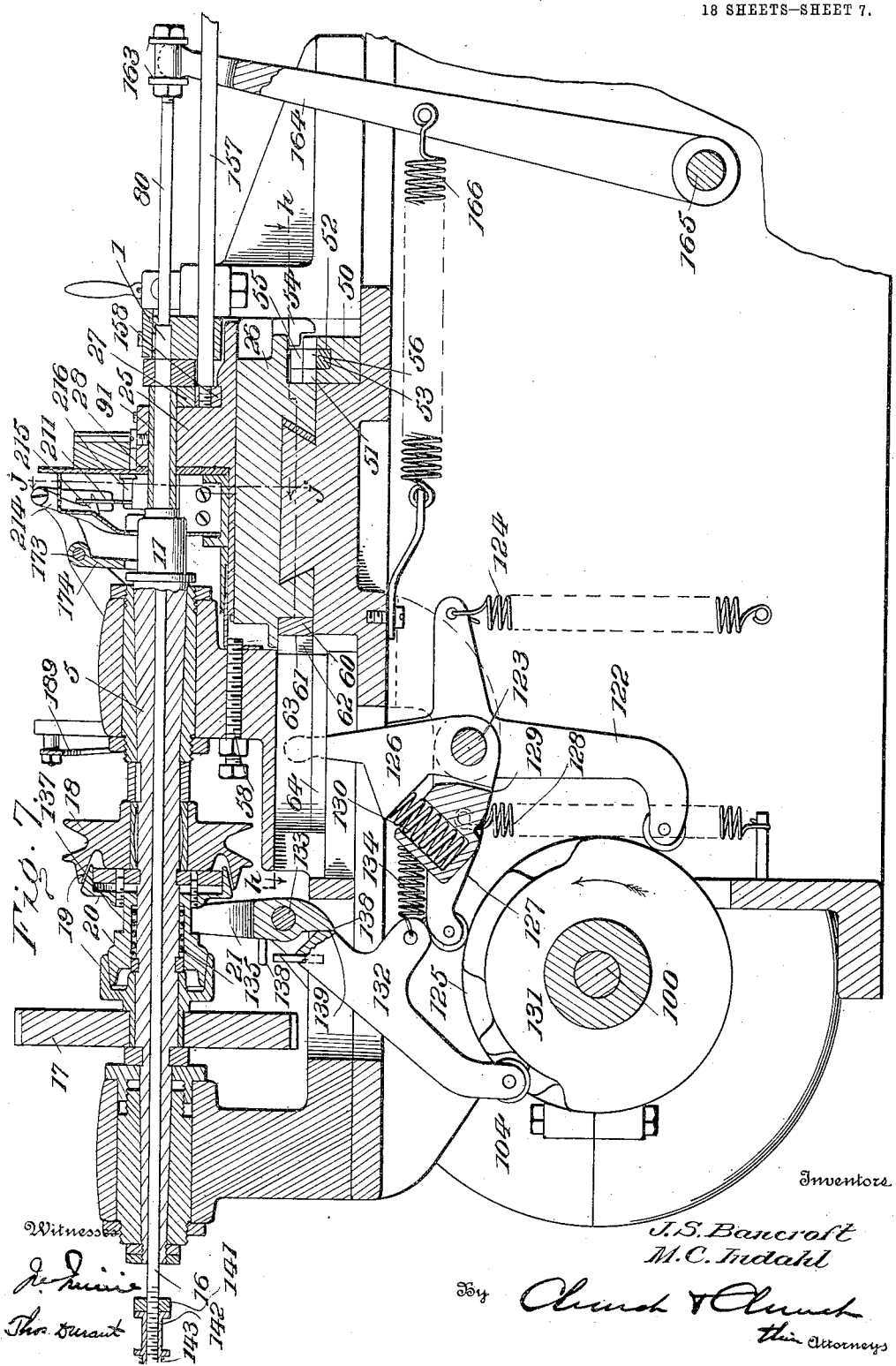

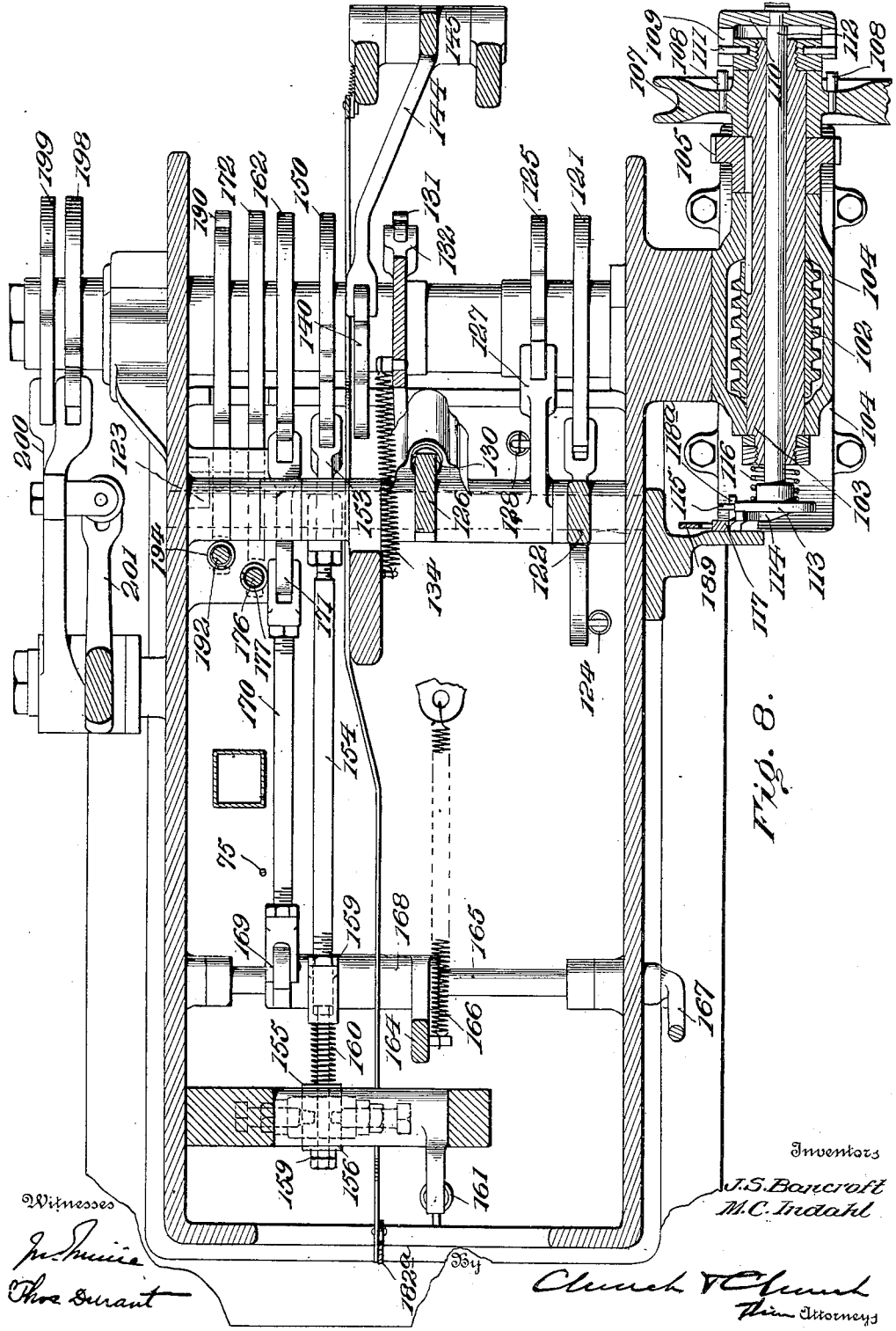

J. S. BANCROFT & M. C. INDAHL.
MATRIX CONEHOLING MACHINE.
APPLICATION FILED JAN. 21, 1910.
1,094,622.
Patented Apr. 28, 1914.
18 SHEETS—SHEET 9.
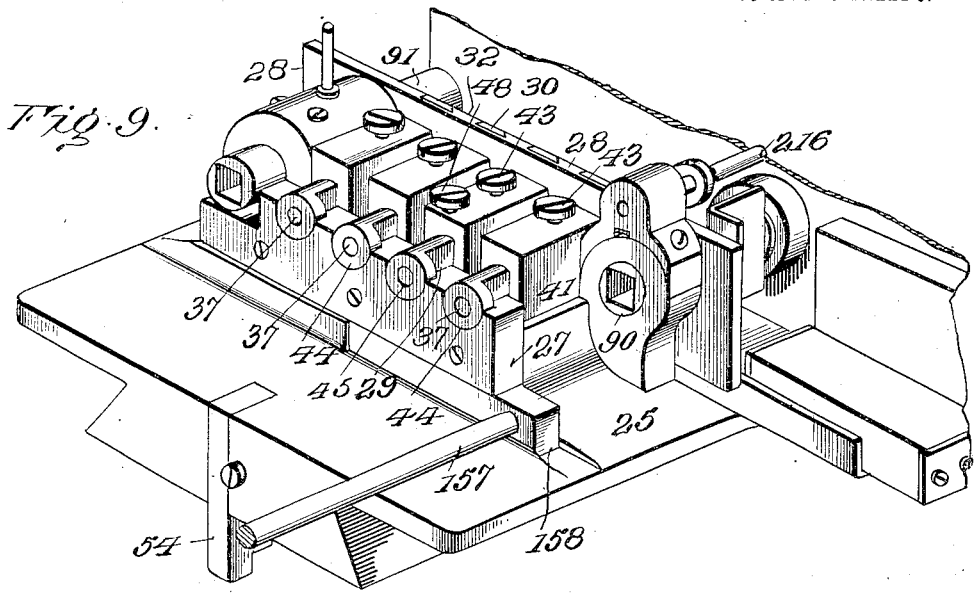
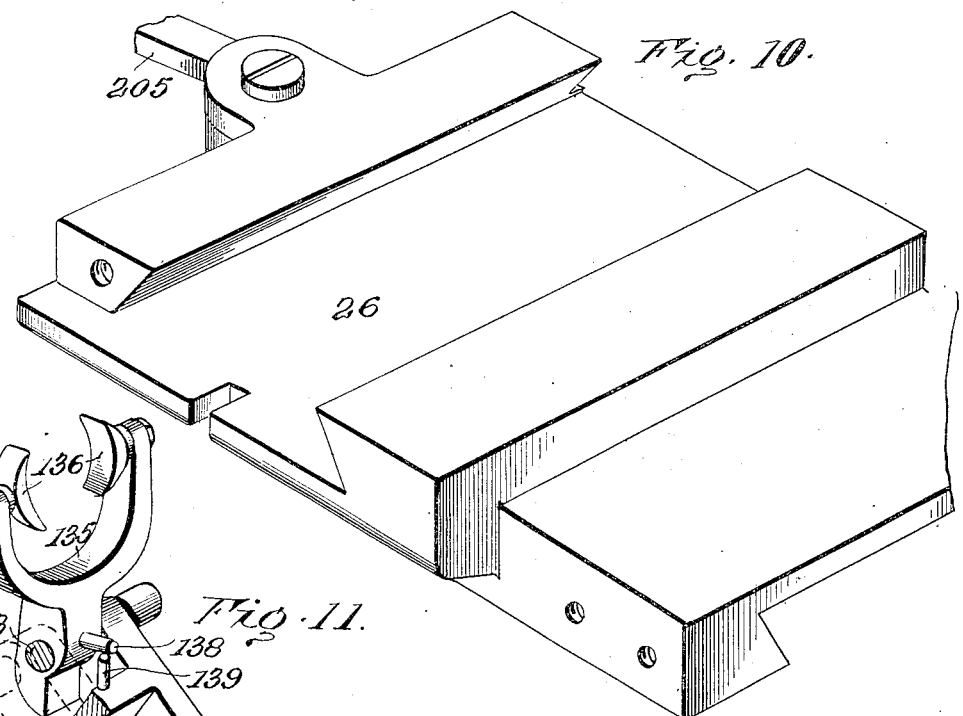
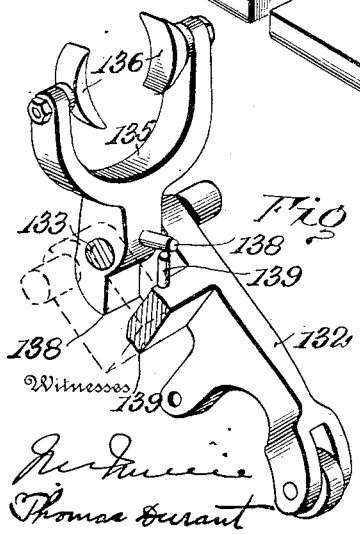
Inventors
J. S. Bancroft
M. C. Indahl J. S. BANCROFT & M. C. INDAHL.
MATRIX CONEHOLING MACHINE.
APPLICATION FILED JAN. 21, 1910.
1,094,622.
Patented Apr. 28, 1914.
18 SHEETS—SHEET 10.
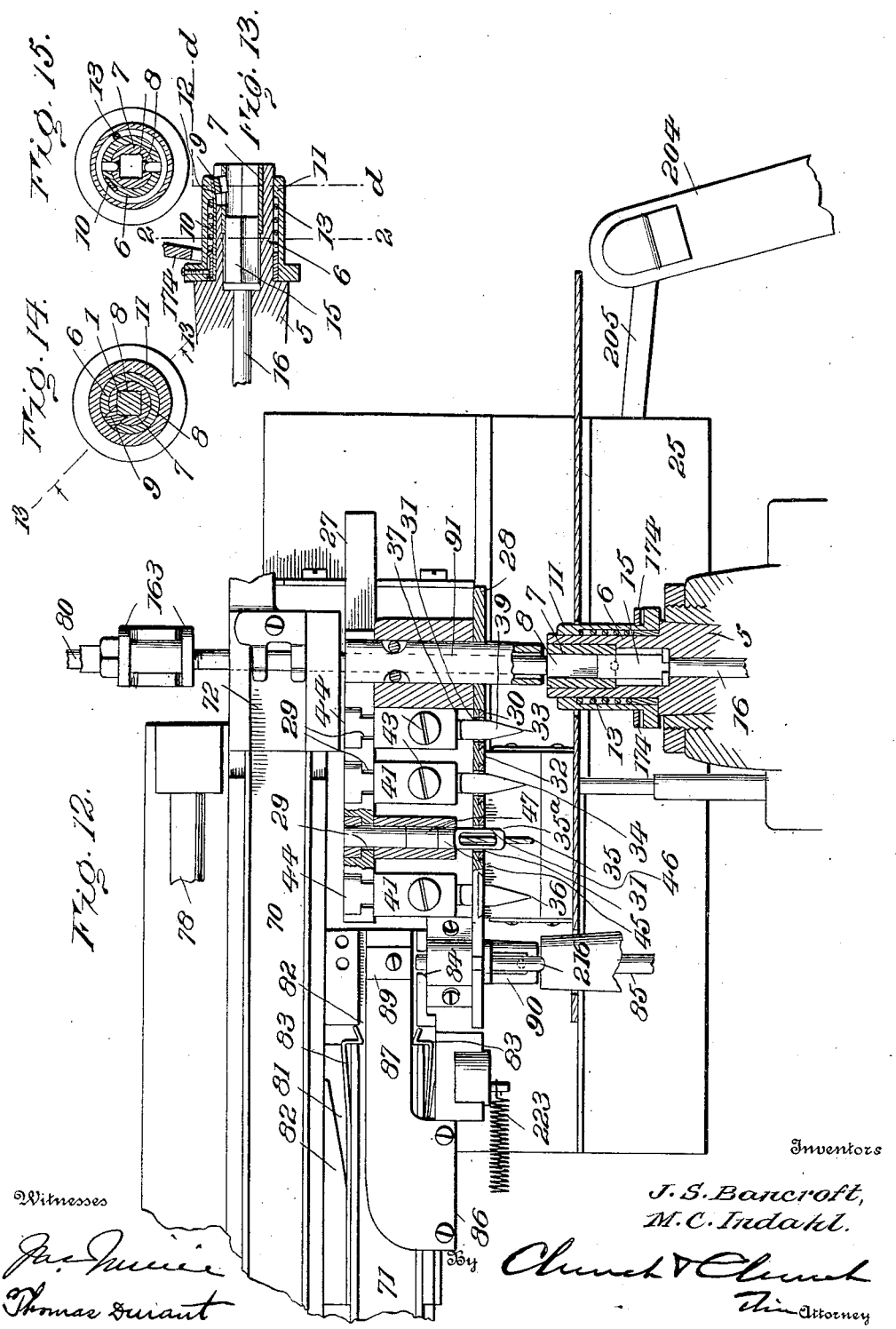

J. S. BANCROFT & M. C. INDAHL.
MATRIX CONEHOLING MACHINE.
APPLICATION FILED JAN. 21, 1910.
1,094,622.
Patented Apr. 28, 1914.
18 SHEETS—SHEET 11.
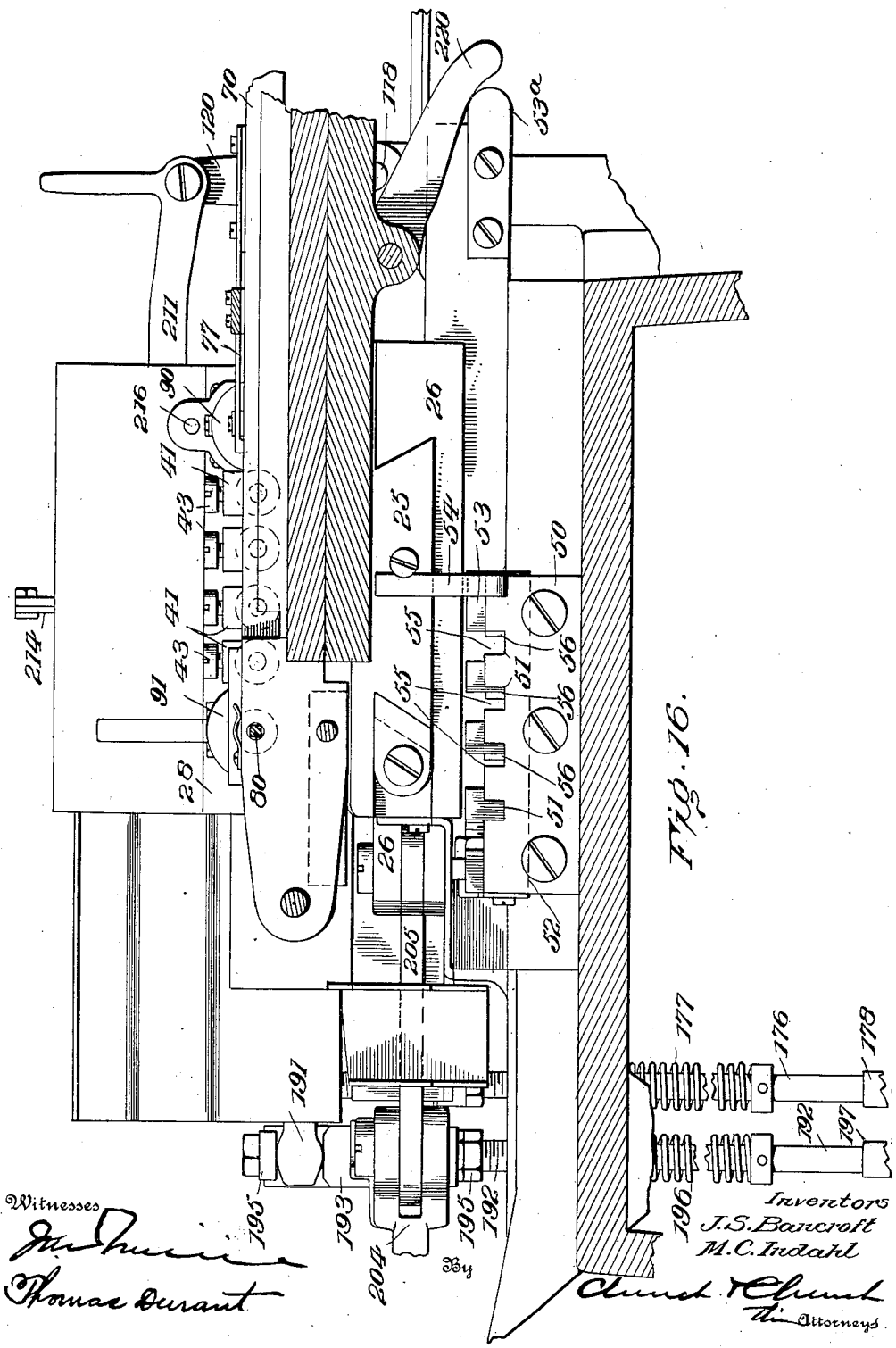

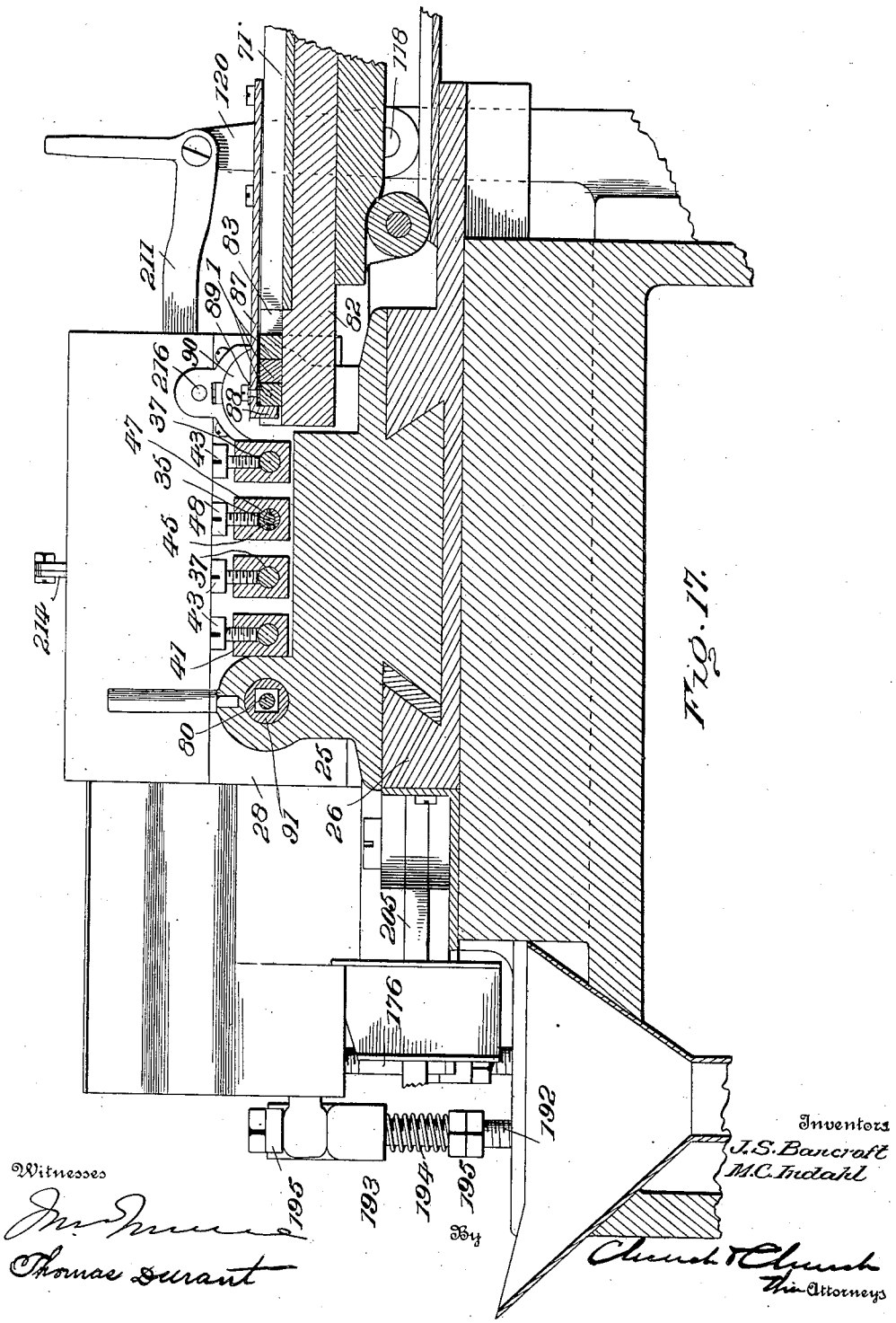

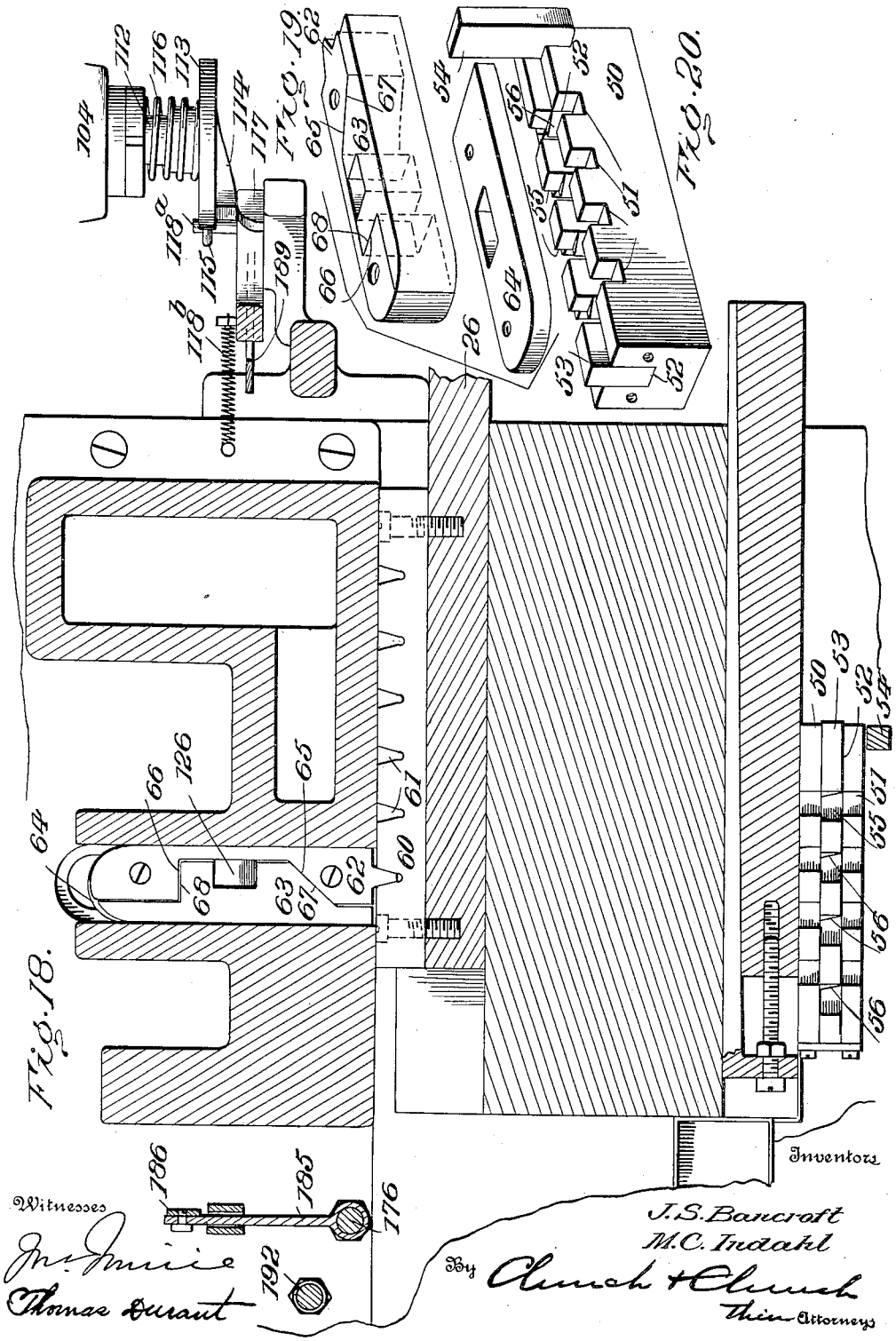

J. S. BANCROFT & M. C. INDAHL.
MATRIX CONEHOLING MACHINE.
APPLICATION FILED JAN. 21, 1910.
1,094,622.
Patented Apr. 28, 1914.
18 SHEETS—SHEET 14.
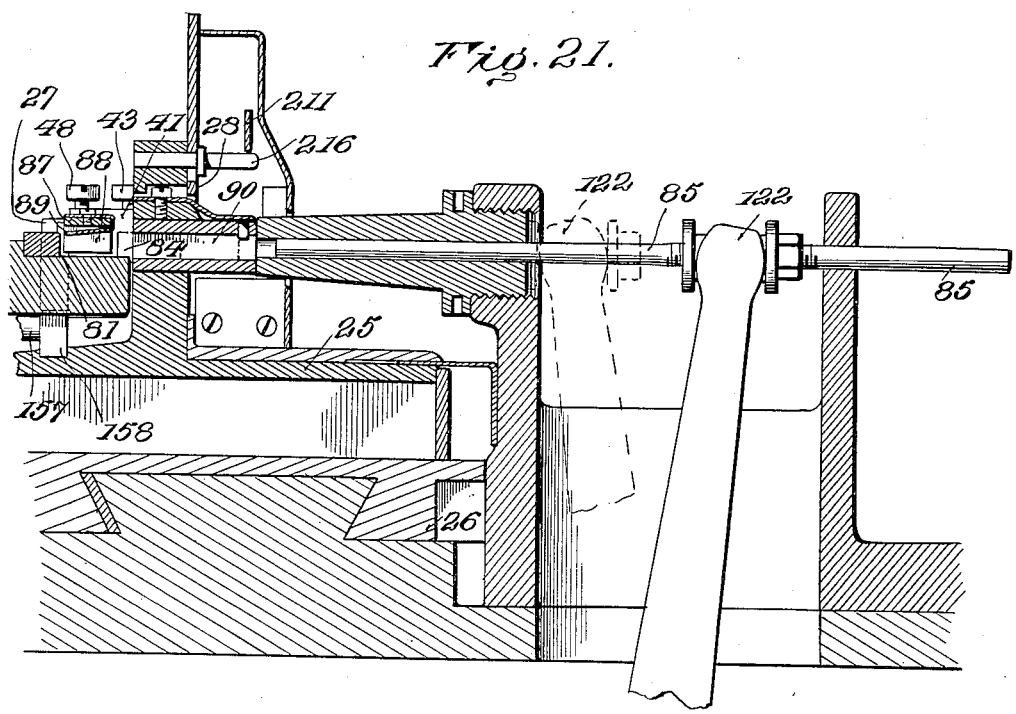
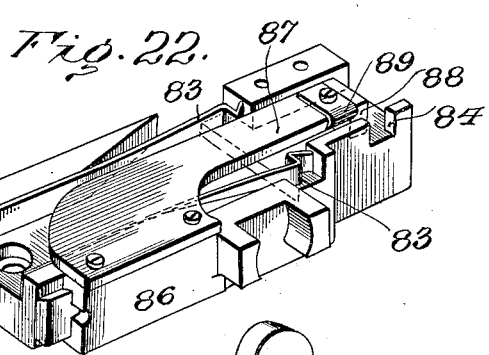
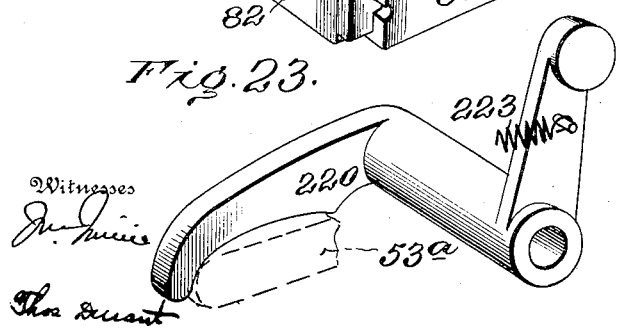
Witnesses
Inventors
J. S. Bancroft
M. C. Indahl
by Church & Church
their Attorneys

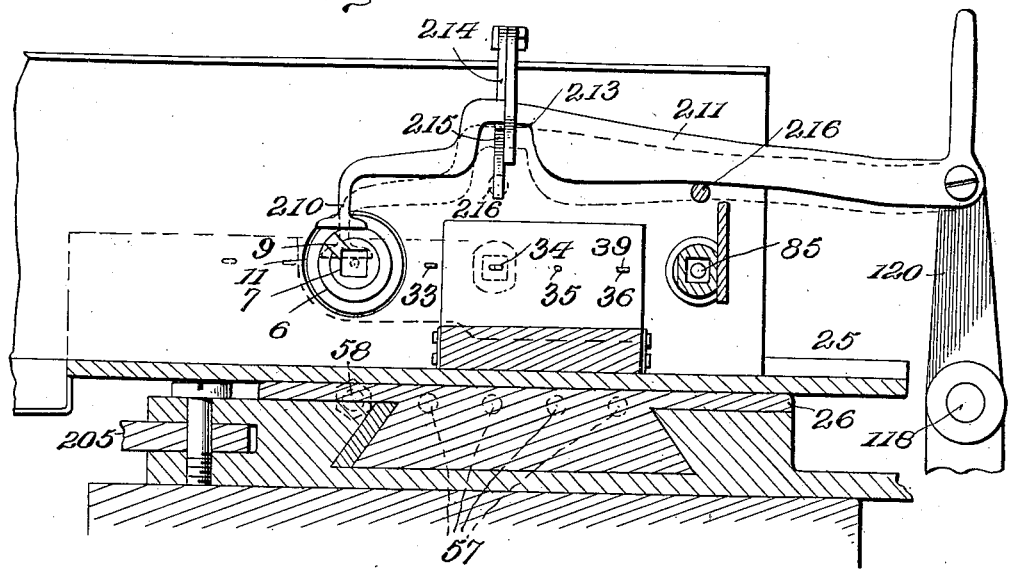
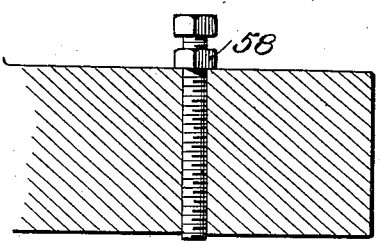
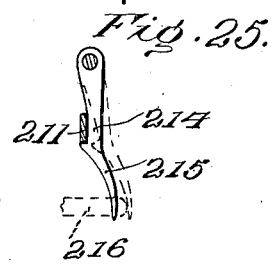
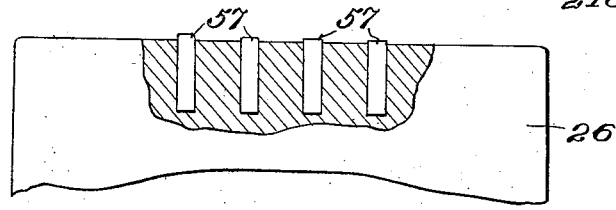
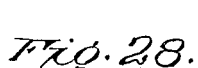
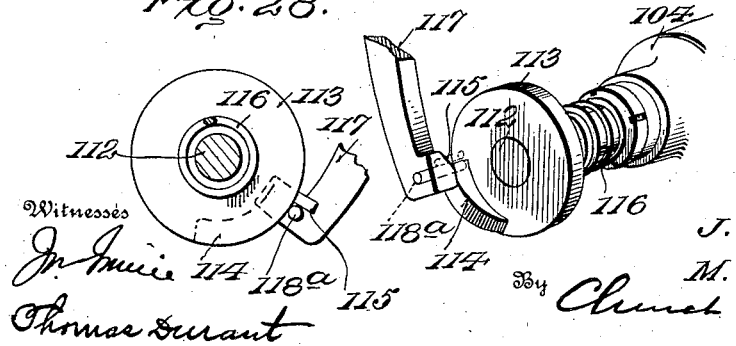

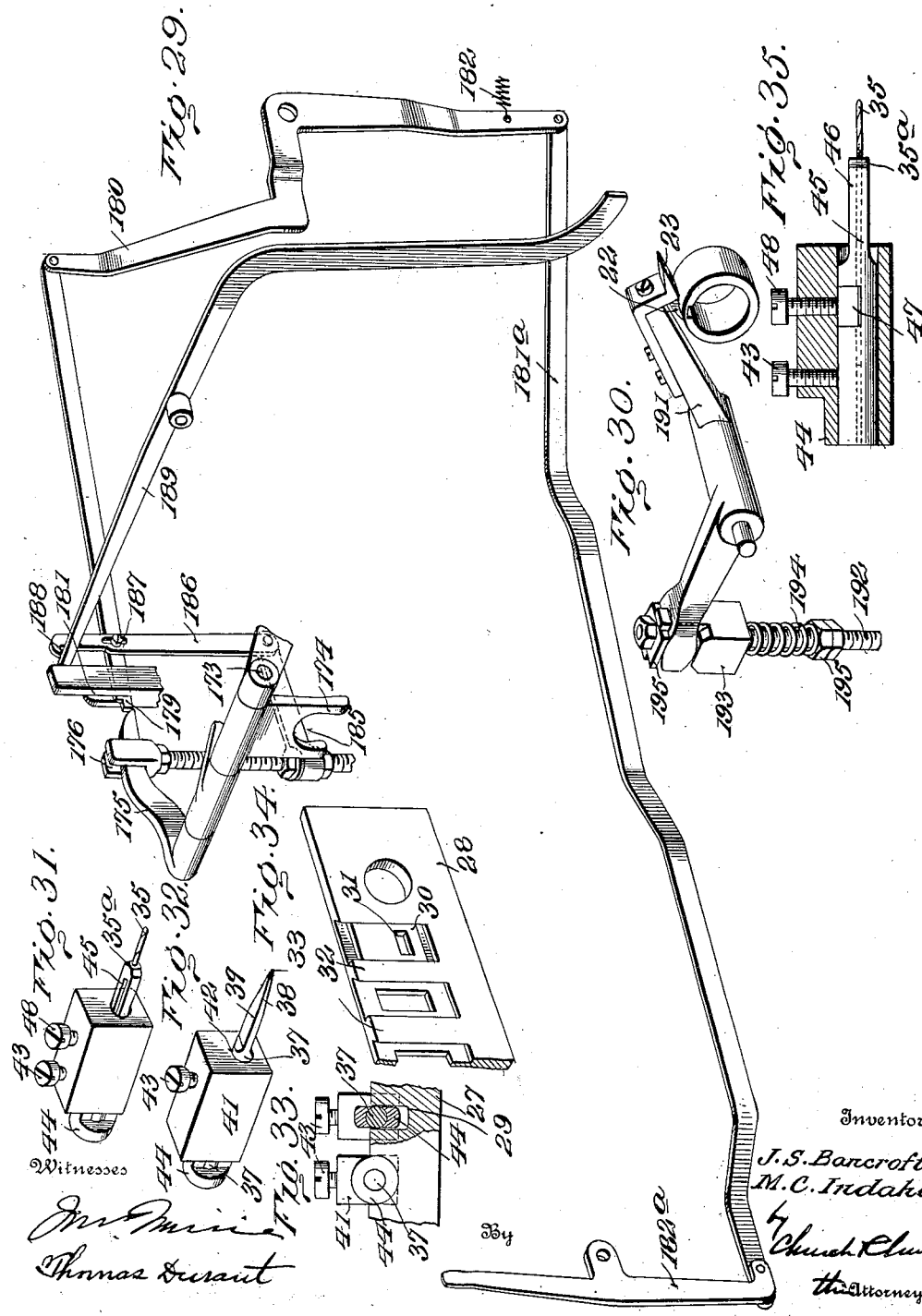

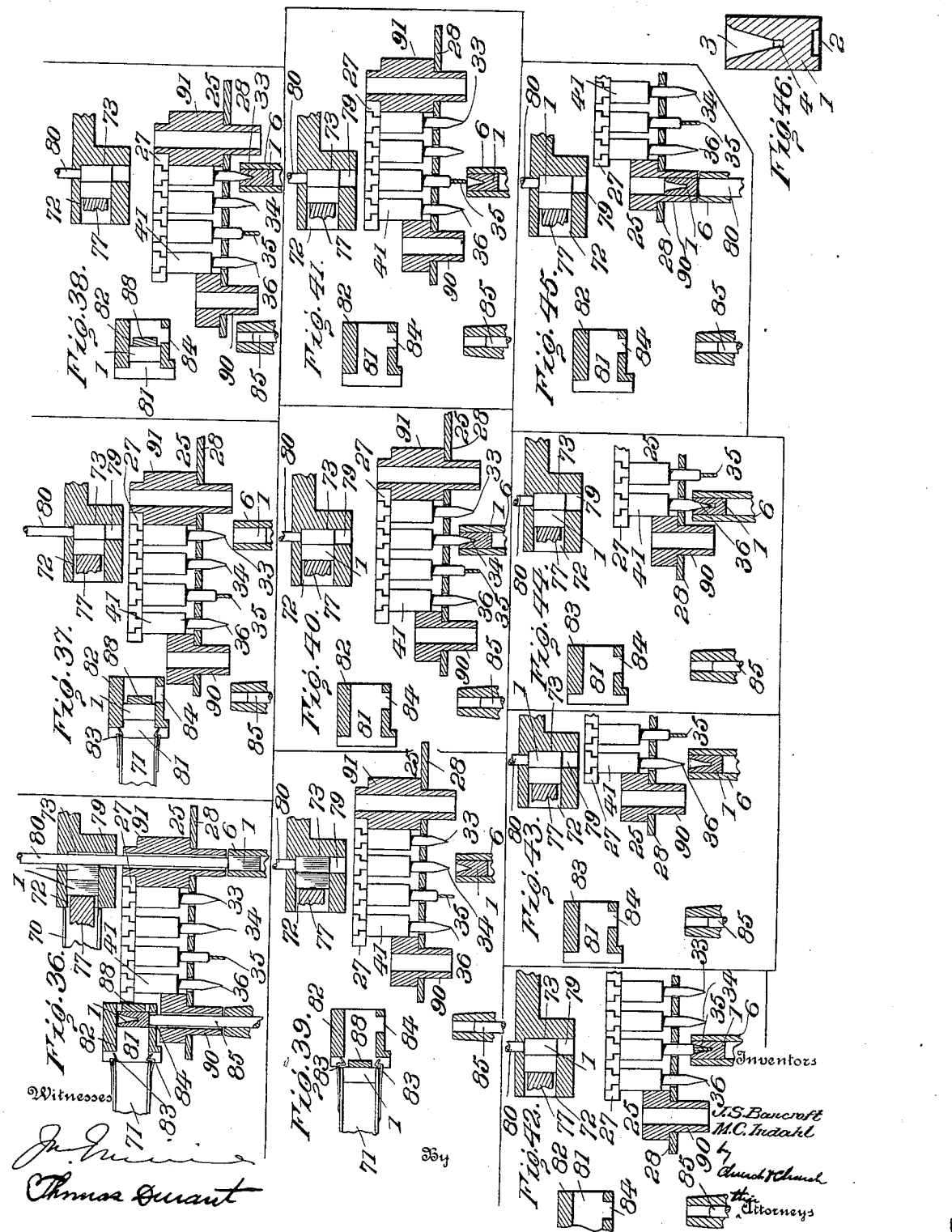

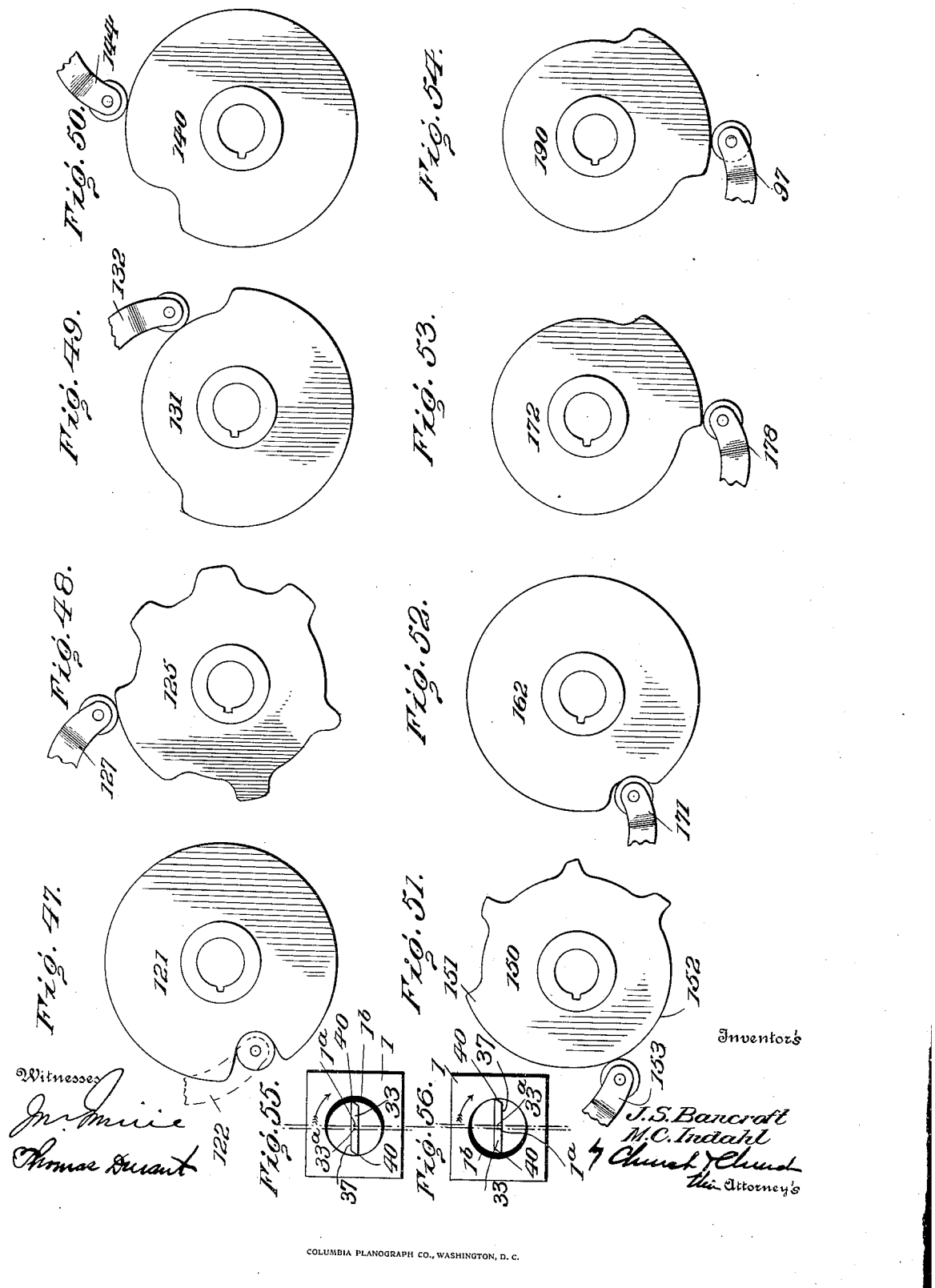

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

MATRIX-CONEHOLING MACHINE.

1,094,622.　　　　Specification of Letters Patent.　　Patented Apr. 28, 1914.

Application filed January 21, 1910. Serial No. 539,286.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Matrix-Coneholing Machines; and we do hereby declare the following to be a full, clear, and exact description of the same, reference being had to the accompanying drawings, forming a part of this specification, and to the figures and letters of reference marked thereon.

This invention relates primarily to the production of conical centering cavities or seats in type matrices, such as those illustrated in Patents Nos. 625,998 of May 30, 1899, and 725,653 of April 12, 1903, and has for its principal object the rapid, economical and accurate formation of said centering cavities.

The invention is embodied in an automatic machine or mechanism wherein the matrix blanks are taken one at a time, from a supply reservoir or galley, delivered to and gaged for position in a revoluble chuck, and then presented or subjected to the action of one or more, preferably four, automatically self-centering cutters operating to produce or finish the conical centering cavity and locate the same in the axial center of the blank, after which the completed matrices are delivered in sequence to a receiving receptacle or galley.

The invention consists in the novel constructions, arrangements and combinations of parts hereinafter fully described, and pointed out in the appended claims.

Figure 2:
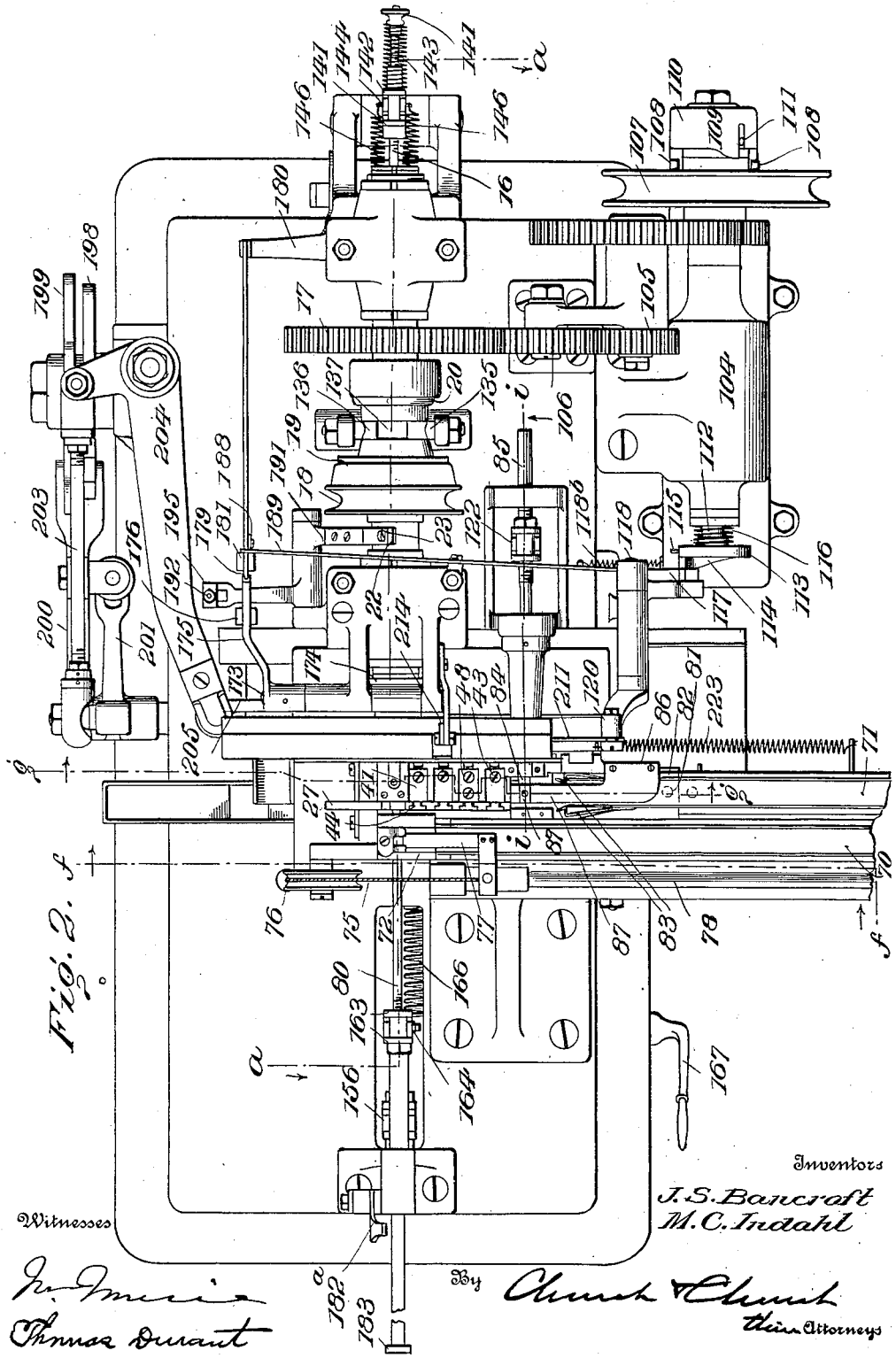
Figure 3:
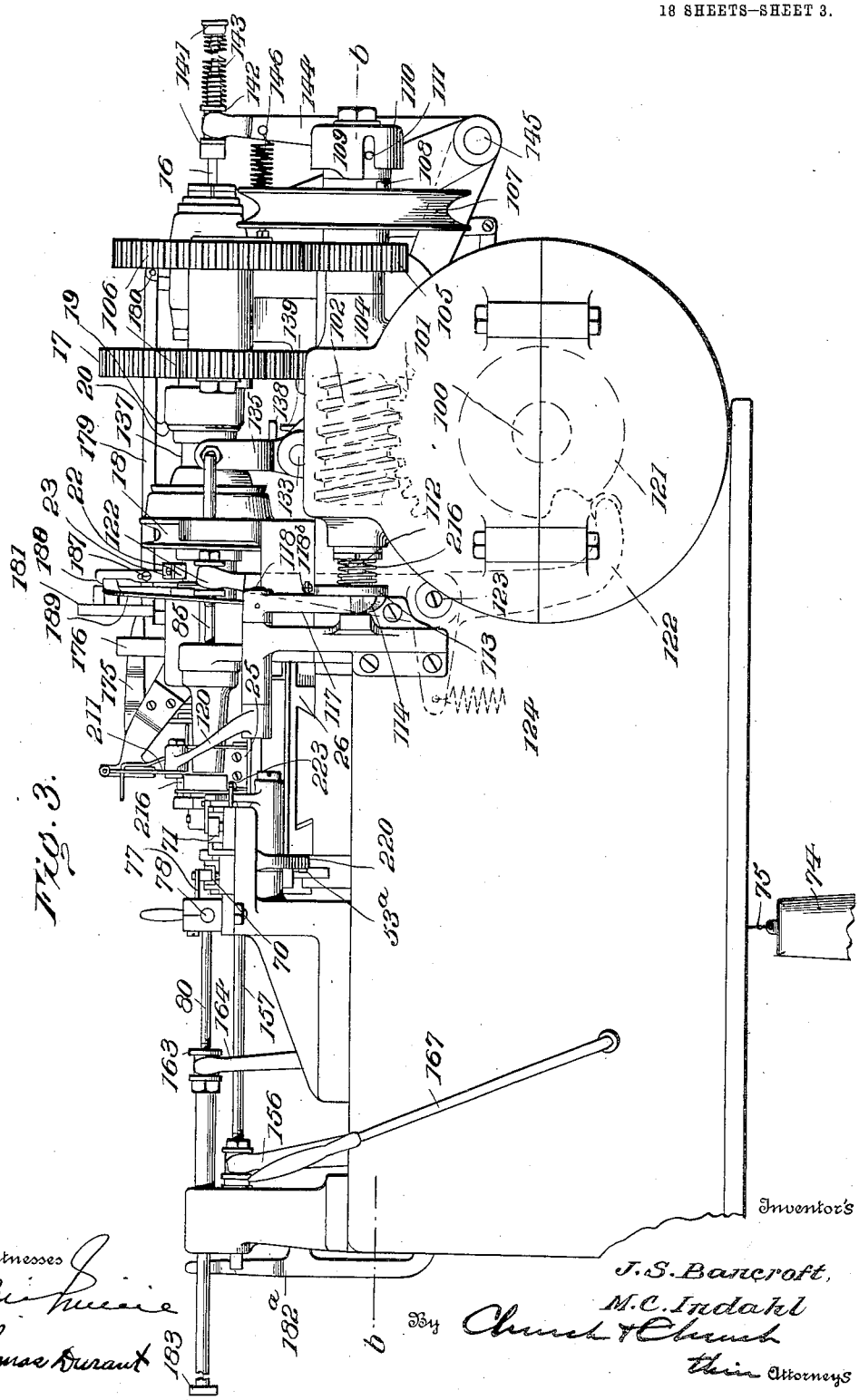
Figure 4:
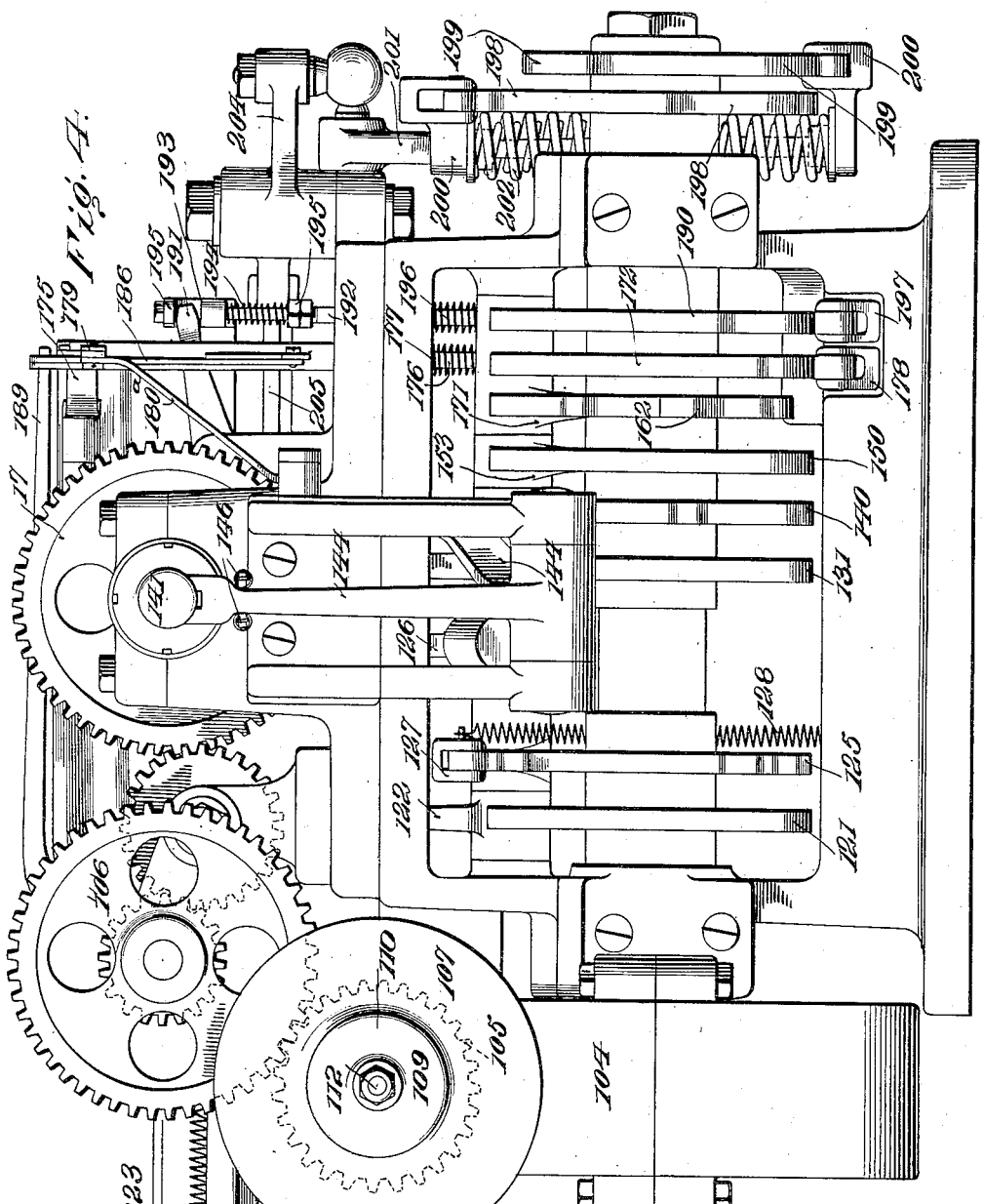
Figure 5:
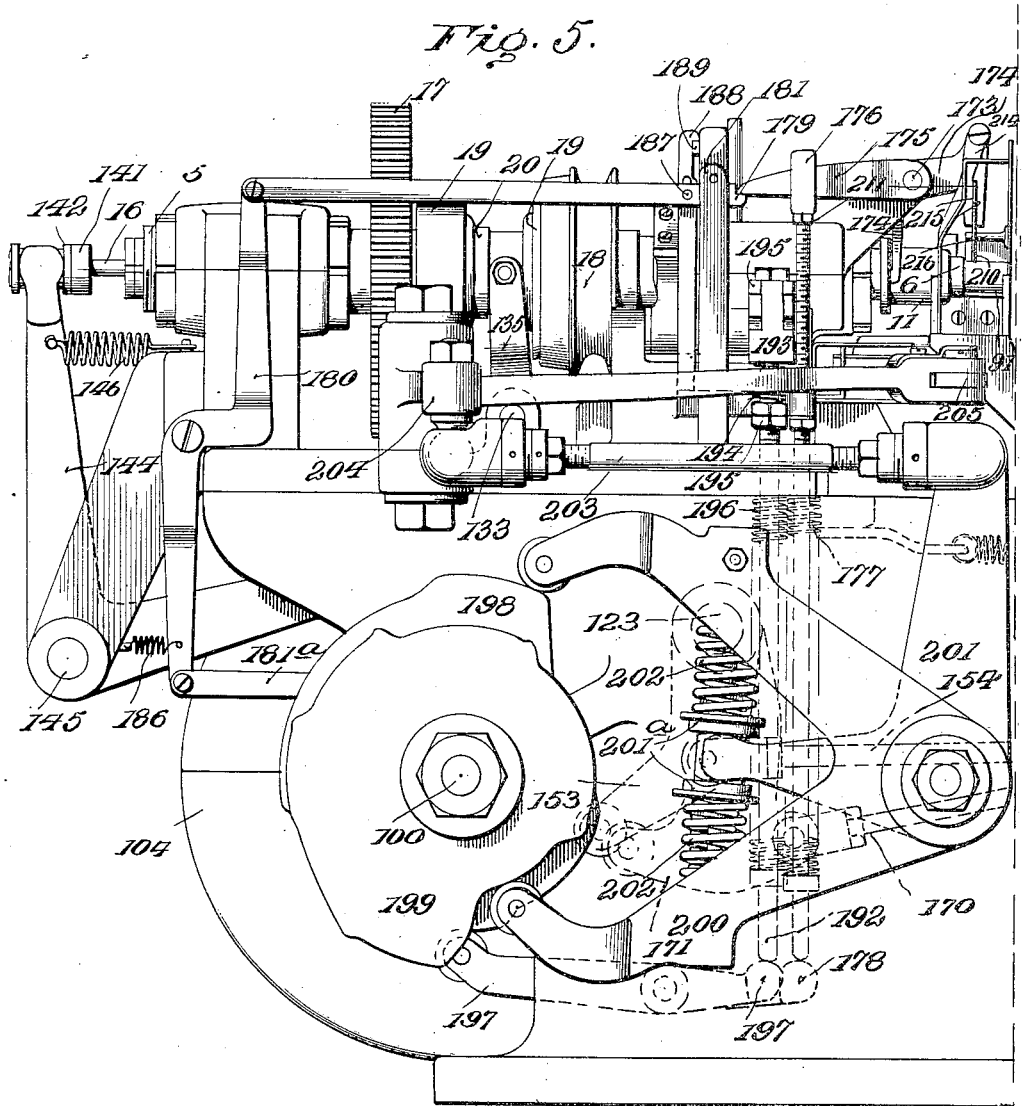
Figure 6:
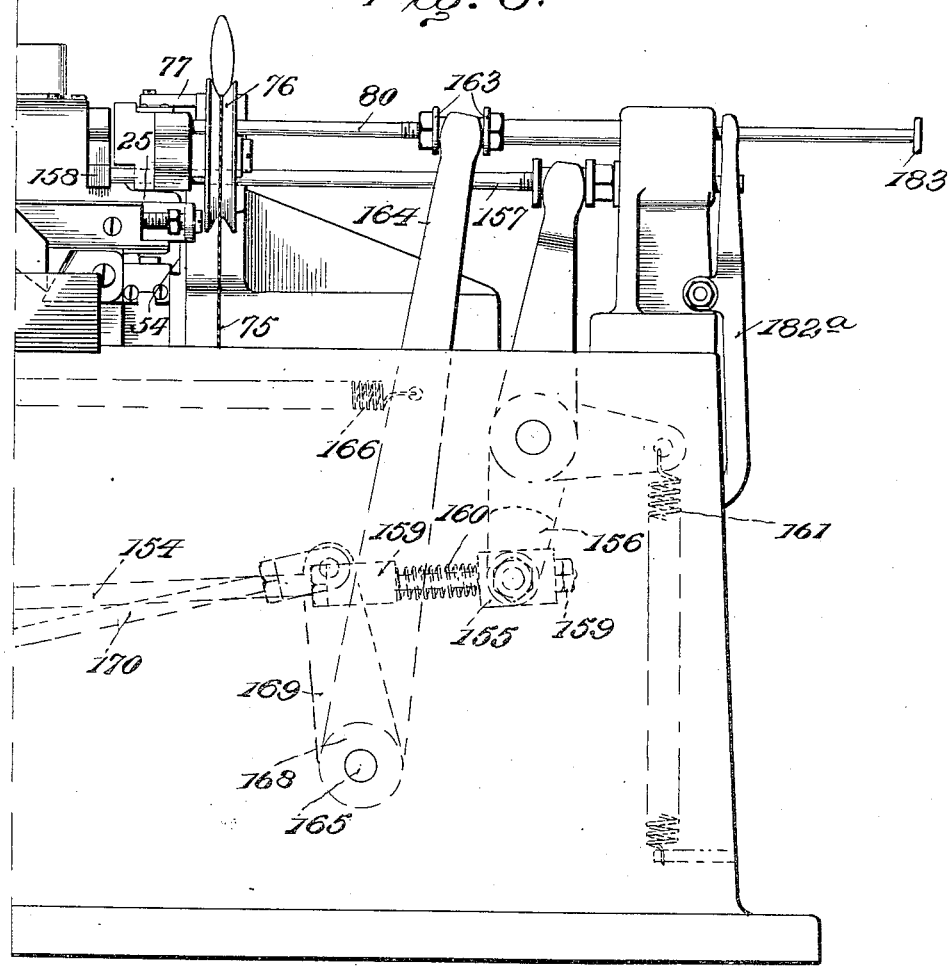

In the accompanying drawings, illustrating a preferred form of embodiment of the invention—Figure 1 is a perspective view of an organized machine; Fig. 2 is a top plan view; Fig. 3 is a front elevation; Fig. 4 is a right end elevation; Fig. 5 is a rear elevation of a part, and Fig. 6 is a similar view of the balance of the machine, these last named figures being taken on an enlarged scale, the line of junction being indicated by a dotted pointing line on each figure. Fig. 7 is a partial vertical section on line $a$—$a$, Fig. 2, looking from the rear toward the front of the machine; Fig. 8 is a horizontal section on the line $b$—$b$, Fig. 3; Fig. 9 is a perspective view of the head carrying the self-centering tools and blank conducting and translating devices; Fig. 10 is a perspective view of the movable slide supporting the tool head, Fig. 9; Fig. 11 is a detail in perspective of the actuating lever for the chuck spindle clutch; Fig. 12 is a top plan view, partly in section, of the tool head, chuck and blank pushers; Fig. 13 is a longitudinal section of the chuck on line 13—13, Fig. 14; Fig. 14 is a transverse section of the chuck on line $d$—$d$, Fig. 13; Fig. 15 is a similar view on line 2—2; Fig. 16 is a transverse vertical section on line $f$—$f$, Fig. 2; Fig. 17 is a partial horizontal section on line $g$—$g$, Fig. 2; Fig. 18 is a partial horizontal section on line $h$—$h$, Fig. 7; Fig. 19 is a perspective view of the tool head gaging and locking bolt and its shoe or supporting plate; Fig. 20 is a perspective of the automatic tool head arrester; Fig. 21 is a horizontal vertical section on line $i$—$i$, Fig. 2; Fig. 22 is a detail view showing the blank feeder for the receiving galley; Fig. 23 is a perspective view of the actuating lever for the blank feeder of Fig. 22; Fig. 24 is a partial transverse vertical section on line $j$—$j$, Fig. 7, showing the drill guard and clutch operating devices; Fig. 25 is a detail of the drill guard trip or latch; Fig. 26 is a detail view of the depth gaging devices for the cutters; Fig. 27 is a detail of the clutch shifting devices; Fig. 28 is a detail sectional view of the clutch shifting devices showing the stop for arresting the machine when the clutch is opened; Fig. 29 is a perspective view of the chuck and clutch operating devices; Fig. 30 is a detail view in perspective of the chuck spindle arresting means; Fig. 31 is a perspective view of the drill holder; Fig. 32 is a similar view of one of the coning drill or reamer holders; Fig. 33 is a detail view showing the manner of supporting the rear ends of the tool holders on the head or slide; Fig. 34 is a detail view showing in perspective the self-centering connection for the tools; Fig. 35 is a longitudinal section of the drill holder; Fig. 36 is a partial sectional and diagrammatic view of the tool head, chuck and blank pushers when discharging a finished matrix into the receiving galley and transferring a blank from the supply galley to the chuck; Fig. 37 is a similar view representing the parts in the positions assumed at the completion of the first lateral feed or step movement of the tool head; Fig. 38 is a similar view, the tool head having been advanced and the first roughing cutter entered into the blank; Fig. 39 is a similar view, the tool head having been retracted and made its second lateral feed movement to bring the second roughing cutter in line with the blank; Fig. 40 is a similar view, the tool head being represented in its forward and advanced position; Fig. 41 is a similar view, showing the result of the third lateral feed movement of the tool head to bring the drill into alinement with the chuck; Fig. 42 is a similar view, with the tool head advanced and the drill entered; Fig. 43 is a similar view showing the result of the fourth lateral feed movement of the tool head to bring the finishing tool in line with the chuck; Fig. 44 is a similar view, the finishing cutter having been advanced; Fig. 45 is a similar view showing the effect of the next or fifth lateral movement of the tool head, to bring the blank carrier into alinement with the chuck; Fig. 46 is a longitudinal section of the finished matrix, shown on an enlarged scale; Fig. 47 is a side elevation of the cam controlling the ejector for transferring the finished matrix from the carrier to the receiving galley; Fig. 48 is the cam controlling the gaging and locking bolt for the tool head; Fig. 49 is the cam controlling the clutch spindle chuck; Fig. 50 is the cam controlling the matrix ejector or pusher carried by the chuck; Fig. 51 is the cam controlling the movements of the tool head upon its supports; Fig. 52 is the cam controlling the chuck loading pusher; Fig. 53 is the cam controlling the opening of the chuck; Fig. 54 is the cam controlling the chuck spindle arresting devices; and Figs. 55 and 56 are diagrammatic views illustrating the action of the self-centering cutter.

Corresponding numerals designate like parts in the several figures.

Before entering upon a description of the automatic machine embodying the present improvements, the nature of its product should be briefly explained in order that the extreme degree of accuracy required, and the delicacy of the operation to be performed, may be the better understood and appreciated.

The matrix herein referred to is a block of metal 1 (Fig. 46) usually of parallelepiped form, containing a type impression or matrix cavity 2 in one end and a conical seat 3 in the opposite end. In the type casting machine a number of these matrices are associated together in a die case or holder and subjected to the action of automatic shifting devices whereby any individual of the series is brought opposite the open end of a mold, the latter adjusted to correspond with the selected matrix, and a conical pin is thereupon thrust into the conical seat or recess, to first center or adjust the matrix to final position, and then clamp and hold it upon the mold while the cast is being made. The centering pin occupies a fixed position transversely of the mold and by its engagement with the conical seat in the selected matrix determines the position of the character or head upon the body portion of the type, hence any departure from the predetermined correlating positions of the centering and matrix cavities will result in a corresponding displacement of the character resulting from the cast. To obtain accurate registry between the matrix and centering cavities two adjacent sides of each matrix are adopted and utilized as base lines or gages for effecting the necessary measurements, and, in practice, the matrix cavity is first formed and justified, i. e., accurately positioned with relation to said base lines, before the centering cavity is completed. In some instances a preliminary centering cavity or cone hole is formed in the matrix at the time the drive is made in the opposite end; but if so a subsequent justifying or finishing operation is necessary, as so far it has been found impracticable to produce a finished and accurately located cone hole by pressure, owing to the irregular expansion of the metal when relieved from the great pressure required for displacement, and the tendency of the punch to drift slightly to one side or the other of the axis. To insure the proper seating of the conical centering pin in the matrix it is the practice to make the seating cavity in the form of the frustum of a cone by forming a shallow drill hole or cavity 4 at the apex of the conical surface, as illustrated in Fig. 46.

The present machine is designed to receive and operate upon matrices (hereinafter referred to as "blanks") after the matrix recess has been applied, and whether or not the blank is provided with the preliminary cone hole referred to.

For convenience of description the machine, as a whole, may be divided into two components, to-wit; the operating members or those acting directly upon the article or blank, to change its shape or maintain or vary its position; and the actuating mechanism for conveying motion to the operating members and uniting the latter into an organized automatic machine. Said operating members include the chuck and its spindle, together with means for gaging the position of the blank, for clamping and rotating the latter, and for arresting the chuck in the blank receiving and ejecting positions; the self-centering cutting devices for forming the cone hole or centering recess in the blank while the latter is carried by the chuck, including means for supporting said cutters, to render them self-centering, means for presenting successive cutters to the blank, and means for regulating and gaging the movements of the cutters; and the blank translating devices, including means for transferring the blanks, one at a time and in sequence, from the blank supply galley to the chuck and from the latter to the finished blank galley.

The chuck is mounted or formed upon the inner end of a hollow spindle 5, and comprises the following elements, to-wit; a head 6 provided with a central recess or socket; a hardened bushing 7 fitted to said socket and formed with a longitudinal opening of angular section to afford two gaging surfaces 8 so disposed, relatively to the axis of the spindle that when a blank is inserted with its adjacent gaging surfaces in contact with said gaging surfaces 8 the axis of its justified cone hole will coincide with the axis of the spindle or, in other words, be accurately located in relation to the sides of the blank and the matrix cavity therein; a clamping jaw or section 9 located opposite the angle formed by gaging surfaces 8 and radially movable in an opening in head 6 and bushing 7, said jaw being carried on the free end of a spring 10 fast on the exterior of head 6 and tending to retract said jaw; a sleeve 11 surrounding head 6 and provided with an incline 12 for engaging jaw 9, to force the latter inward when the sleeve is moved in one direction; a spring 13 interposed between head 6 and sleeve 11 and operating to advance incline 12 into contact with jaw 9 and thus effect the automatic closing of the chuck; and a gage block 15 (also constituting part of the blank translating devices through its connection with rod 16 extending longitudinally through spindle 5) movable longitudinally within head 6 and bushing 7, said gage block or a hardened collar in rear thereof contacting with the rear end of the recess and serving to gage the longitudinal position of the blank within the chuck through the contact therewith of the matrix face of the blank. In addition, spindle 5 is provided with a reversing drive in the form of a loose gear 17, a loose driving pulley 18, each provided with a friction clutch section 19, and an intermediate longitudinally movable double ended clutch member 20 coupled to rotate in unison with the spindle and movable longitudinally thereof into engagement with either clutch section 19, the whole constituting a reversing driving mechanism. A spring 21 interposed between a collar on the spindle and a shoulder on clutch member 20 tends to withdraw the latter from contact with gear 17, and force it into engagement with driving pulley 18, the latter revolving in the opposite direction to said gear wheel. The spindle is also provided with a radial shoulder 22 in position to be engaged by a detent 23 when the latter is thrust into its path, said shoulder and detent acting in conjunction with gear 17 to position the chuck with relation to the blank-translating devices.

The cutters are mounted upon a two-way movable tool-head 25, i. e., movable both laterally and longitudinally with respect to the axis of spindle 5, to which end said head is mounted upon a support or slide 26 in guides running parallel with spindle 5, and said support or slide is in turn carried on guides on the frame extending transversely of said spindle. The tool-head or cutter carrier is equipped with two housings or uprights 27, 28 of which the outer one (27) is provided with spaced open bearings or vertical slots 29, and the inner one (28), that next to the chuck, with correspondingly spaced slides 30, one opposite each bearing 29. Each slide 30 is perforated to form an elongated bearing 31, extending transversely of and preferably at right angles to the guides 32 upon which the slide reciprocates, and the parts are so proportioned or arranged that the slide is permitted a slight amount of rotary movement about bearing 31, sufficient in degree to effect a binding of the slide upon its guides and thus interpose a frictional resistance to the movement of the slide upon its guiding surfaces. The function and importance of this feature will presently appear. The present machine being designed to operate upon blanks unprovided with preliminary centering cavities is equipped with four cutters, to-wit; two tapering roughing cutters 33, 34, a cylindrical or twist drill 35 with a chamfering cutter 35ª and a tapering finishing cutter 36. The roughing and finishing cutters 33, 34 and 36 are similar in construction, with the single exception that the two first named are provided with drill points, formed by flattening opposite sides of their extremities on converging planes, and this feature may, if desired, be present in the finishing cutter, although not required. Each of said tapering cutters is provided with a shank 37 for attachment to a holder, a tapered cutting point 38, and an intermediate flattened section 39, the latter fitting loosely between the opposed faces of the bearing 31, in slide 30, and free to move longitudinally of said bearing in a direction transverse of guides 32. Each cutter is furnished at one end with two substantially similar converging cutting edges 40 symmetrically disposed on opposite sides of the axis of the tool. Preferably a separate tool holder is provided for each cutter, the same including a body portion 41 containing a socket 42 for the reception of shank 37; a clamping screw 43; and a rear extension 44 the opposite sides whereof are flattened to form a loose fit with bearings 29 of the tool carrier housing 27.

In order to adapt the ordinary twist drill to the holder, a supplemental holder is employed, the same comprising a tubular shank 45 with flattened extension 46 similar to sections 39 of the tapering cutters and a clamping section 47. The shank is fitted to the socket in the tool holder and the latter is provided with an extra set screw 48 for engaging clamping section 47 by which the drill is held in the supplemental holder while the cutter is confined in the tool holder by the engagement of clamping screw 43 with shank 45.

Now the purpose is to render each of the cutters 34, 35 and 36 self-centering so that when any cutter is brought into contact with the rotating blank at a point slightly to one side of the axis of rotation, it will be automatically shifted into alinement with said axis, to the end that the tapering recess formed thereby may be accurately justified with relation to the character recess. If the cutters were supported in fixed relation to each other upon the carrier or tool head and it was attempted to bring them successively into alinement with the axis of the chuck through progressive movements of the carrier, it would be found impossible to secure the desired uniformity of product within the almost infinitesimal degree of tolerance permitted, approximately .0001 inch without repeated readjustments of the parts to compensate for variations in alinement occasioned by changes of temperature, the spring of the material, and other causes more or less directly traceable to the rigid attachment of the cutters, and it is to avoid the loss of time incident to such adjustments and the loss of material resulting from imperfect product that the self-centering cutter mechanism has been devised and applied. Through the movement of the tool head the cutters are each brought as near as may be into alinement with the revolving chuck and then advanced until the cutter contacts with the exposed end of the blank. The cutter held against longitudinal displacement by the engagement of its holder with the bearing 29 of housing 27, is free to rotate slightly when brought into contact with the blank, and in so doing opposite edges of its flattened section are pressed into frictional engagement with and take a bite on opposite walls of its bearing 31 in slide 30; and, at the same time, a like rotary or tilting movement is communicated to slide 30 causing the latter to take a frictional grip on its guides. If it so happens that the cutter stands at the time with its axis in register with the axis of rotation of the blank it will retain its position during the feed of the cutter by virtue of the counter-balanced pressure on its opposite cutting edges. If, however, the cutter is presented with its axis slightly to one side of that of the blank it will be caused to rotate about said last named axis, and in so doing the cutter will shift laterally in its bearing 31 and slide 30 in its guides, said movement being induced by the eccentricity of the produced cavity. This lateral bodily movement of the cutter is, however, resisted by the friction of the cutter and the slide in their bearings, thereby causing the edge by which the cutter is moved or pushed laterally to take a deeper cut, and this action recurs with each edge of the cutter at each half revolution of the blank, rapidly reducing the eccentricity of the cavity until it entirely disappears and the axis of the produced conical cavity is then exactly coincident with the prolonged axis of the chuck and exactly corresponds with the diameter of the cutter at any point.

The self-centering action of the cutter is illustrated diagrammatically in Figs. 55 and 56, wherein $1^a$ represents the axis of rotation of the blank, $33^a$ the axis of the cutter, and $1^b$ the eccentricity of the produced cavity or, in other words, the section of material which must be removed to render the cavity concentric. During each half revolution of the blank the cutting edge more remote from the axis $1^a$ is engaged by the inner face of the eccentric portion $1^b$ and the cutter is forced laterally until its axis $1^a$ passes axis $1^b$ or from the position indicated in Fig. 55 to that in Fig. 56, and vice versa. By reason of the frictional resistance opposing the lateral movement of the cutter the edge engaged by the eccentric portion $1^a$—the left edge in Fig. 55 and the right edge in Fig. 56—is caused to bite deeper than the opposite edge so that said eccentric portion is gradually reduced in thickness until it entirely disappears. The axial feed of the cutter is so proportioned to the speed of the blank that the eccentric portion $1^b$ will be eliminated and the produced cavity rendered concentric with the axis of rotation of the blank before the conclusion of said feed movement, and when this occurs the cutter is held in its centered position by the equal pressure upon opposite cutting edges. Axial alinement between the cutter and blank being thus assured, it is obvious that by regulating the longitudinal feed movement of the cutter in its relation to the matrix end of the blank and forming the opposed cutting edges symmetrically, at the desired angle, it becomes possible to produce a conical cavity of predetermined depth and section, and to automatically duplicate the same in a series of blanks, a result almost, if not quite, impossible of attainment when rigidly supported cutters are employed and alinement is dependent upon fixed guiding surfaces, owing, in part, to the disturbing influences of contraction and expansion (incident to changes in temperature and necessitating frequent observations and re-adjustments) and to the springing of the cutter, for, should the latter be presented with its axis eccentric in any degree to that of the rotating blank, the superior pressure thereby directed upon the outer cutting edge would not only tend to deflect the cutter and thus distort the cavity, but the diameter of the produced cavity as compared with that of the cutter would be enlarged proportionally to the degree of such eccentricity.

Cutters 33, 34, 35 and 36 are arranged in sequence in the direction of motion of tool-head 25 upon slide 26, with their axes as near as may be in parallel with each other and with the planes of movement of said tool head and slide, and to insure their presentation in regular order, beginning with the first roughing cutter 33 and ending with finishing cutter 36, to regulate the depth of cut and to prevent the engagement of subsequent tools in the event one is broken or the tool-head fails to complete its movement toward the chuck, a sequence indicator or designator is employed to supplement the actuating devices hereinafter described for effecting the relative movements of the tool head and its support.

To the frame is secured a block 50 containing a series of transverse channels 51, one for each cutter and spaced to correspond therewith, and a longitudinal slot or way 52 forming a guide for the automatic designating or lockout bar 53. Tool head 25 is equipped with a pilot member in the form of a dependent arm 54 which is presented opposite one of the channels 51 and passes therethrough whenever a cutter is brought opposite the chuck and the tool head is advanced. Bar 53 is also provided with a series of transverse slots or ways 55, the corresponding side walls of which are equipped with cam faces 56 inclined to the line of motion of the tool-head upon its support. Slots 55 are spaced at their rear or narrow ends to correspond with the spacing of channels 51 plus the width of the base of the incline 56, the arrangement being such that when any one of the slots 55 is in register with its complemental channel 51, to permit the passage of arm 54 and the engagement of the cutter with the blank, the remaining channels 51 will be partially closed and the passage of the arm therethrough prevented by the interposition of the bar 53 in the path of arm 54, and, further, that the next succeeding slot in the series, and that one only, will be opened by the action of arm 54 upon incline 56. Thus, the way for the presentation of the next succeeding cutter is opened by the advance of the preceding cutter, and all danger of starting up at a wrong stage is prevented. During the feeding movement of the tool-head arm 54 does not pass beyond and thereby clear slot 55, hence does not complete the movement of bar 53 necessary to fully uncover the next succeeding channel 51, until the tool head has finished its feeding movement and the cutter has penetrated to the predetermined extent. If, therefore, from any cause, such as the breaking of the point of the cutter, the tool head is prevented from completing its feeding movement, the advance of the next succeeding tool when brought into position opposite the blank will be barred and the tool head arrested by bar 53, and thus the probable breakage of such succeeding tool and mutilation of the blank will be prevented. Bar 53 is held to its adjusted positions by friction and it is returned to initial position after the series of cutters have acted, by its engagement with an abutment 53ª on slide 26. Tool head 25 is also equipped with a series of gage pins 57, one for each cutter and spaced to correspond with the latter, said gage pins coöperating with an adjusting screw 58 to limit the forward or feeding movement of the tool head and depth of cut when the corresponding cutter is presented to the blank.

To lock and at the same time finally position slide 26 when shifted to bring any cutter into alinement with a blank in the chuck, said slide is provided with a bar 60 containing a series of V-shaped notches 61 spaced to correspond with the several positions of adjustment. Supported to reciprocate longitudinally in bearings on the frame is a bolt 62, whose engaging end is adapted to fit any one of the notches 61 when presented opposite said bolt. To prevent the displacement incident to lost motion and to insure the accurate positioning of slide 26, and, incidentally, that of the cutters, the locking bolt is formed in two sections 62, 63 of which the engaging section 62 is carried on a supporting shoe 64 and provided on one side with an incline 65 at approximately 45° near the engaging end, and a shoulder 66 in rear thereof. The other section 63 to which the actuating devices are connected, is provided with an incline 67 in rear of incline 65 and with a shoulder 68 in front of shoulder 66 of the bolt section 62, the arrangement being such that when the bolt is advanced to engage slide 26 both sections will move together until section 62 is engaged, whereupon the further advance of section 63, through the action of inclines 65, 67 will crowd section 62 against its side bearing, which latter thus becomes a gage for positioning the engaging end of the locking bolt. Upon the reverse movement of section 63 wedge 67 is first withdrawn, to relieve side pressure, after which shoulders 66, 68 are engaged and section 62 retracted.

The last of the so-called operating elements are those by which the blanks are fed to the chuck and discharged therefrom as a finished product.

Mounted in suitable supports on the frame are the supply and receiving galleys 70, 71. At the delivery end of the supply galley and forming a continuation thereof is a fixed channel 72 terminating in transverse wall 73 against which one end of a column of blanks is held under the pressure of a weight 74, the latter connected by cord 75 passing over pulley 76 to a follower 77 projecting into the galley in rear of the column of blanks therein and traversing upon a guide rod 78. An angular opening 79 is formed in the side of channel 72 contiguous to wall 73 and in alinement with chuck on spindle 5. A pusher 80 is arranged to act upon the foremost blank, to thrust the same through opening 79 into the chuck, as will presently be explained. The receiving end of galley 71 registers with a channel 81 in a block 82 fixed to the frame and provided with spring retaining fingers 83 forming parts of the side walls of said channel. Beyond said fingers one side wall of channel 81 is notched or cut away, as at 84, to form an entrance passage for the blank, and opposite said passage is arranged a pusher 85.

Supported to reciprocate upon block 82 and longitudinally of the channel in the latter is a slide 86 carrying a plate 87 the latter provided with a downward projection or lip 88 and a spring retainer 89. Normally, lip 88 stands back of or beyond side entrance 84, to permit entrance of the blank intermediate said lip and the receiving galley.

In addition to the cutters hereinbefore described, tool head 25 is equipped with two tubular guides 90, 91 in parallel with the cutters and spaced to correspond therewith. The shorter of these guides, 90, is located at the front of the tool head and is so adjusted and proportioned that when the tool-head is in its rearmost position; that is at the last step in the movement of slide 26 one end of guide 90 will register with the opening in chuck 6, to receive the finished blank expelled by gage block 15, and when said head is in the opposite or front position, the other end of said guide will register with the entrance notch 84, through which the blank received from the chuck is transferred by pusher 85. The longer guide, 91, is located in rear of the series of cutters and is adapted to bridge the interval between the chuck and discharge opening 79 of supply channel 72 when the tool head is in its extreme forward position, at which stage pusher 80 is in position to transfer a blank from the supply channel through said guide into the chuck, the latter being at the time open and held in register with the channel in said guide by the engagement of detent 23 as before explained.

The sequence of operations to be performed by the so-called operating members thus far described will be found indicated diagrammatically in Figs. 36 to 45, inclusive. At the beginning of the cycle of operations, tool-head 25 occupies its extreme front position with guide 91 in alinement with the chuck and guide 90 opposite the entrance 84 to the receiving channel. Sleeve 11 of the chuck is retracted to open the latter and shoulder 22 is held in contact with detent 23 by the friction clutch connection with gear 17. Slide 26 is held by locking bolt 62 engaging the first of the series of notches 61, Fig. 18. With the parts in this position, pushers 80 and 85 advance from relatively opposite directions, the first transferring the end blank from the supply channel through guide 91 into the chuck, while the second pusher entering guide 90 expels the previously finished blank contained therein into the receiving galley, as indicated in Fig. 36. Sleeve 11 is now released and advanced by its spring to close the chuck; pushers 80, 85 and detent 23 are retracted; spindle 5 is uncoupled from gear 17 and coupled with driving pulley 18; locking bolt 62 is withdrawn, and tool head 25 is moved one space to the rear. This brings the first roughing tool 33 opposite the blank in the rapidly rotating chuck, the parts now occupying the relative positions shown in Fig. 37, with slide 26 engaged by locking bolt 62. Tool head 25 is next advanced to the position indicated in Fig. 38, forming a preliminary cavity whose depth is determined by corresponding gage pin 57. During the cutting movement of tool head 25, arm 54 passes into the first slot 51 in block 50 and the corresponding slot in bar 53, and by its engagement with incline 55 shifts bar 53 to uncover the next succeeding slot 51, providing the cutting movement is completed. After the first roughing cut, tool head 25 is again retracted and slide 26 moved one step to present the second roughing cutter 34, as in Fig. 39, followed by a second advance of the tool head (Fig. 40) to finish the second cut. These movements are repeated for each succeeding cutter, as illustrated in Figs. 41 to 44, inclusive, resulting in the completion of the centering cavity as represented in Fig. 45. After the withdrawal of the finishing tool 36 slide 26 takes its last step to the rear thus bringing guide 90 in register with the chuck. In the meantime detent 23 has been engaged, and the chuck opened, whereupon gage block 15 is advanced and the finish blank discharged from the chuck into guide 90, Fig. 45, where it remains until the tool carrier returns to initial position, Fig. 36, thereby completing the cycle of operations.

It remains to describe the actuating mechanism for giving motion to the operating devices at the proper times and in the required degree to render the machine as a whole automatic in all respects save the supplying of the galley with blanks and the removal of the finished articles, and in this connection it is proper to state that the blanks are usually arranged in the galley before the insertion of the latter, and, further, that they are assembled with their two gaging sides in such relation to the chuck that when delivered to the latter said sides will always register with the complemental gaging surfaces 8 of the chuck bushing 7.

Supported in bearings on the frame is the main cam shaft 100, to one end of which is secured a worm wheel 101, the latter engaged by a worm 102 on transverse shaft 103. The worm shaft takes its bearings in a sectional frame 104 secured to the main frame and inclosing the worm and worm wheel. Keyed to shaft 103 is a pinion 105 the latter connected with the spindle reversing gear 17 through a reducing train of gears 106. Supported to turn upon shaft 103 is a driving pulley 107 provided with a clutch section in the form of pins 108 adapted to be engaged by a complemental clutch section 109 carried by shaft 103 and, in the form illustrated, consisting of a notched sleeve 110 engaging pins 111 fixed on a collar attached to the shaft and adapted to receive pins 108. Sleeve 110 is movable longitudinally of the shaft into and out of engagement with pins 108 carried by pulley 107, and said sleeve is attached to a rod 112, extending longitudinally of the shaft and bearing on its opposite end a head 113, the latter provided with a cam or incline 114, and a stop pin or shoulder 115. A spring 116 interposed between head 113 and a bearing on the frame tends to bring and hold sleeve 110 in engagement with pins 108, in other words, to close the clutch between the driving pulley and shaft 103. An arm 117 attached to shaft 118 is arranged to be swung into the path of cam 114, between the latter and a bearing on the frame, and when so swung it operates to displace rod 112, longitudinally, thereby opening the clutch. The accidental closing of the clutch is prevented and the position of arrest of the driven member is determined by a pin or shoulder 118$^a$ carried by arm 117 and engaged by the stop pin or shoulder 115 of head 113, the arrangement being such that when arm 117 is swung into engaging position and is engaged by cam 114, to open the clutch, pin 118$^a$ will be advanced into the path of pin 115 and be engaged by the latter just after the high point of the cam takes a bearing on arm 117 and the clutch has opened. A spring 118$^b$ coupled with arm 117 tends to normally hold the latter out of the path of the cam, and the lever 120 attached to shaft 118 affords a means convenient to the operator for stopping the machine.

Keyed or otherwise secured to shaft 100 is a series of ten cams, eight of which are represented in Figs. 47 to 54, inclusive, and the remaining two in Fig. 5. The first of the series, counting from the front, is cam 121, Fig. 47, controlling pusher 85 through lever 122 (Fig. 3) pivotally supported upon a shaft 123 and provided with a retracting spring 124. One arm of lever 122 carries a roller engaging the periphery of cam 121, and the other arm is furcated and received between collars on the pusher. The second cam 125, Fig. 48, actuates locking bolt 62 through levers 126 and 127, the latter pivotally supported on shaft 123. The free end of lever 126 engages section 63 of the locking bolt, while the free end of lever 127 is equipped with a roller held in contact with the periphery of cam 125 by a spring 128. The two levers 126, 127 are independently pivoted and are connected through the medium of contact surfaces 129 and opposed compression spring 130. The retraction of the bolt is effected by spring 128 acting through contacts 129 when roller on lever 127 approaches the center of shaft 100 in the space between contiguous prominences on cam 125, and the projection of said bolt into contact with the notches on slide 26 at the high portions of the cam is effected through spring 130, whereby said locking bolt is held, after seating, under elastic pressure. The third cam 131, Fig. 49, controls the clutch section 19 on spindle 5 intermediate driving pulley 18 and gear 17 through connections, best seen in Figs. 7 and 11, including a lever 132 pivotally supported on a pin 133 and held in engagement with cam 131 by a spring 134, and a second lever 135 also pivoted upon pin 133 with its outer or free end furcated and provided with pivoted shoes, 136, riding in a circumferential groove 137 in clutch section 19. Lever 135 is provided with two radial contacts 138 and lever 132 with intermediate complemental contacts 139. The interval between contacts 138 is somewhat in excess of that between contacts 139, the arrangement being such that immediately the clutch section is released from gear 17, spring 21 will become operative to effect a quick transfer of said clutch section into engagement with driving pulley 18. Should clutch section 19 stick in contact with gear 17, the upper contact 139 on lever 135 by its engagement with the upper contact 138 of lever 132 will release section 19 and permit its engagement with pulley 18 under the pressure of spring 13. The fourth cam 140, Fig. 50, is coupled with the depth gage block 15 when acting as an ejector for discharging the completed blank from the chuck into carrier guide 90, as before explained. The rear end of rod 16 is provided with two collars 141 and between these is arranged a circumferentially grooved sleeve 142 and a spring 143, the latter interposed between said sleeve and the collar nearest the end of rod 16, to the end that when the sleeve is moved to eject the blank it will engage the collar and move block 15 positively, and when moved to its limit in the opposite direction, to retract rod 16, it will hold block 15 firmly under elastic pressure against the rear end of the containing recess, thus insuring its position as a gaging member. A lever 144 pivotally supported at 145 has one arm furcated and engaging sleeve 142, while the other arm carries a roller held in contact with cam 140 by the action of a retracting spring 146. The fifth cam 150, Fig. 51, reciprocates tool head 25 upon slide 26 longitudinally of spindle 5. Although slide 26 has six stations, four for the cutters and two for the translation of the blanks, head 25 advances but four times during each cycle, that is once for each cutter. Accordingly cam 150 is provided with four eminences of which three are relatively narrow and abrupt, while the fourth, 151, is formed with a gradual incline preceded by a concentric depressed section 152. Projection 151 corresponds with the first roughing cutter, hence is designed to initiate the centering cavity by giving a more gradual feed to said cutter, while the more abrupt sections of the other prominences are designed to quickly enter the cutters and bring them into operative position, after which the more gradual feed movement takes place. It is during the passing of section 152 that the finished blank is transferred to guide 90, Fig. 45, and ejected from said guide to the receiving galley and a fresh blank delivered from the supply galley to the clutch, Fig. 36. Pivoted upon shaft 123 is a lever 153, Fig. 8, one arm whereof carries a roller in engagement with cam 150 and the other arm is coupled to a rod 154 whose opposite end passes through a pivoted bearing 155 in a lever 156. One arm of lever 156 is furcated and secured between adjustable collars on a rod 157, the latter connected at its inner end to a cross-head or shoe 158 riding in a groove in tool head 25 parallel with the motion of slide 26. Rod 157 is supported near opposite ends in bearings in the frame and is located opposite and in parallel with chuck spindle 5. Rod 154 passes loosely through bearing 155 and is provided with two shoulders or collars 159 the outer one directly engaging said bearing while a spring 160 is interposed between said bearing and the opposite or inner shoulder 159. As thus arranged, the thrust of the cam to advance the tool head 25 toward the chuck is transmitted through spring 160, and the return of the tool head is effected through the medium of a spring 161 connected to lever 156, said last named spring also serving to hold lever 153 in engagement with its cam 150. The sixth cam 162, Fig. 52, operates upon the chuck loading pusher 80, to which end the latter is provided with spaced adjustable collars 163 between which is received one end of a lever 164 secured to a rock shaft 165, and provided with a spring 166, tending to advance pusher 80 longitudinally toward the chuck, and with a hand lever 167. A sleeve 168 attached to lever 164 carries an arm 169 the latter connected by a rod 170 to a lever 171 swung on shaft 123 and carrying a roller engaging the periphery of cam 162. The seventh cam 172, Fig. 53, controls the opening of the chuck. Supported in suitable bearings on the frame above and transversely of spindle 5 is a shaft 173 carrying a furcated arm 174 embracing sleeve 11 of the chuck in front of and in position to engage a collar on said sleeve, to retract the latter against the pressure of chuck closing spring 13 and thereby open the chuck for the discharge of finished and the insertion of unfinished blanks. Fast on shaft 173 is an arm 175 lying in the slotted or furcated upper end of a rod 176, the latter suitably supported in guides on the frame and held retracted by spring 177 against one arm of the actuating lever 178 whose other arm carries a roller in contact with cam 172. The movement of arm 174 for opening the chuck is derived from cam 172 in effecting the upward movement of arm 175, and the closing of the chuck is effected by its spring 13 immediately upon the descent of rod 176. To insure the chuck remaining open until after the insertion of a new blank by pusher 80 and, in the event of a failure of the latter to effect delivery, to automatically stop the machine, means are provided whereby the closing of the chuck is made dependent upon the completion of the feeding movement of pusher 80. Opposite the free end of arm 175 and in position to pass beneath and be engaged thereby is arranged a latch 179, Fig. 29, the latter pivotally supported at its outer or rear end upon one arm of a lever 180, and with its inner or engaging end lying in a slotted bearing 181. A spring 182 connected to lever 180 operates to advance the latch 179 into engagement with the end of arm 175 when the latter is retracted to withdraw arm 174 from the collar on chuck sleeve 11, and to advance the latch beneath and in the path of arm 175, whenever the latter is raised to open the chuck. The lower arm of lever 180 is connected by a link 181ª to the corresponding arm of a lever 182ª, the upper arm of the latter projecting into the path of a shoulder or collar 183 on pusher 80, the arrangement being such that upon the elevation of arm 175 to open the chuck, latch 179 will advance, to bar the return of said arm 175 (consequently the closing of the chuck by its spring 13) until pusher 80 has advanced and seated a fresh blank in the chuck, when, through the engagement of shoulder 183 with the upper arm of lever 182ª, lever 180 is tilted to withdraw latch 179 and permit the chuck to close. In the normal operation of the machine the withdrawal of latch 179 takes place just before arm 175 reaches said latch during the descent of rod 176. If, however, pusher 80 is arrested before completing its feeding movement latch 179 will not be withdrawn from the path of arm 175 and will intercept the latter. To an arm 185 adjustably secured to rod 176 is pivoted one end of a link 186, the latter coupled with latch 179 by a pin and slot connection 187 and provided with a shoulder 188 in position to engage a lever 189 when latch 179 is advanced beneath arm 175 of the clutch operating devices. The opposite end of lever 189 is in position to engage arm 117 of the driving clutch opening devices. Whenever latch 179 is thrust beneath arm 175 link 186 is oscillated to bring its shoulder 188 above lever 189, and in like manner the withdrawal of latch 179 will remove shoulder 188 from the path of lever 189 and no movement of the latter will take place, owing to the fact that the projection and withdrawal of latch 179 takes place while rod 176 is elevated. But if, as before explained, latch 179 is caused to retain its forward or engaging position during the descent of rod 176, shoulder 188 on link 186 will also retain its engaging position, and inasmuch as said link is connected and moves with rod 176 the downward motion of the latter will be communicated through lever 189 to unclutching arm 117, thereby opening the driving clutch and bringing the machine to a standstill. The eighth cam 190, Fig. 54, controls detent 23 for arresting spindle 5 to cause its chuck jaws to register with the blank translating guides 90, 91. Detent 23 is carried on one arm of a lever 191, the other arm whereof is coupled with a rod 192 through a bearing block 193 and spring 194, these last named members being interposed, in sequence, between nuts or collars 195 on rod 192 in such manner that the movement of the rod to throw detent 23 into the path of shoulder 22 will be transmitted through spring 194. Rod 192 is provided with a retracting spring 196 and engages a lever 197 carrying a roller in contact with cam 190. The remaining two cams 198 and 199, Fig. 5, act in conjunction to effect the step by step movements of the tool head support or slide 26 and to return the same to initial position. Pivoted upon the frame is a two armed lever or rocker 200 each arm carrying a roller in engagement with the periphery of one of the cams 198, 199, but on relatively opposite sides of the axis. Supported to oscillate about the axis of lever 200 is a second lever 201, one arm of which is located intermediate the two members of lever 200 and connected with each through a head 201ª and a spring 202, thus forming an elastic or yielding connection between the two levers when moved in either direction. The other arm of lever 200 is coupled through link 203, bell crank lever 204 and link 205, with slide 26.

A portion of the machine not falling strictly within either of the two general divisions adopted, *i. e.*, operating and actuating devices, but intimately related to both is the means for automatically effecting the stoppage of the machine upon the breaking of the drill 35. The clearance recess formed by the drill at the bottom of the conical recess is small, hence the drill is slender and liable to break and leave a portion embedded in the blank. Unless the machine is stopped before the next or finishing cutter is presented and fed to the blank containing the broken drill point, the probability is that both the blank and cutter will be mutilated, as will succeeding blanks unless the defect is remedied at once. To guard against this a detector, preferably in the form of a feeler 210, connected with and controlling arm 117 of the driving clutch mechanism, is arranged to make contact with the drill as the latter is withdrawn from the blank. If the drill is intact nothing unusual occurs; but if the drill is broken connection is immediately established between a moving part of the machine and arm 117, whereby the latter is shifted to open the driving clutch. In the preferred form of embodiment illustrated the feeler 210 is carried by a link 211 pivotally attached at one end to an arm 120 fast on shaft 118, and occupies a position opposite the chuck but to one side the axis thereof. The under edge of link 211 is notched or recessed, as at 213, and opposite the latter on the side next the chuck is pivotally suspended a latch 214 provided with an inclined nose or extension 215. The latch is so hung that it will gravitate into engagement with link 211 or a spring may be provided. Mounted upon tool head 25 and extending beneath link 211 is a pin 216, the latter so related to latch 214 and drill 35, that when pin 216 is brought opposite the chuck, through the step by step movement of slide 26 and preliminary to the advance of the tool head toward the blank, said pin will stand beneath notch 213 and in alinement with the extension 215 of latch 214, at such distance from the latter that when the feeding movement of the tool head is about finished the latch will be pressed back out of engagement with link 211, and the feeler 210 permitted to descend by gravity into contact with the drill, as indicated by the dotted lines in Figs. 24 and 25. The feeler will be upheld by the drill as the latter is withdrawn from the blank and until, during the next step movement of the tool head, pin 216 again passes beneath and into engagement with an incline on the lower edge of link 211 thereby elevating the latter and effecting the reëngagement of latch 214. The engaging face of feeler 210 is extended in the line of travel of slide 26, to sustain link 211 during the movement of this tool head and until said link is again engaged by pin 216. If, however, the drill is broken the feeler will be permitted to descend until pin 216 has entered notch 213, thereby coupling link 211 with tool head 25, so that during the next succeeding stepwise movement of its supporting slide 26, to bring the next or finishing cutter opposite the chuck, it will move link 211 and its connected arm 120 in a direction to advance arm 117 into the path of the unclutching cam 114 and thus effect a stoppage of the machine before the next advance of the tool holder.

Blank feeding slide 86 is engaged by one arm of a lever 220, Figs. 16 and 23, pivoted on the frame with its other arm projecting into the path of an abutment 53ᵃ on slide 26. A spring 223 connected to lever 220 operates to produce the feeding movement of slide 86, while abutment 53ᵃ engages said lever to retract slide 86, when slide 26 is moved to the front to bring guide 90 opposite pusher 85, Fig. 36, so that when said pusher is advanced to discharge the finished blank the latter will enter the receiving galley in front of lip 88 and as slide 26 is moved to the rear spring 223 will operate to displace the blank.

Having thus described our invention, what we claim as new and desire to secure by Letters Patent of the United States is—

1. A matrix coneholing machine including the following elements, in combination, to-wit; a rotatory chuck provided with blank gaging and holding means; a self centering cutter and means for effecting relative reciprocation of said chuck and cutter.

2. A matrix coneholing machine provided with the following elements, in combination, to-wit; a rotatory chuck provided with means for gaging the longitudinal position of the blank; a plurality of self centering cutters; and a tool head or carrier for said cutters movable laterally of the axis of the chuck for presenting the cutter successively to the blank, and longitudinally of said axis for engaging and withdrawing individual cutters.

3. In a matrix coneholing machine such as described, the combination of the following elements, to-wit; a rotatory chuck; means for gaging the longitudinal and lateral positions of an inserted blank within the chuck; a cutter provided with a plurality of converging cutting edges symmetrically disposed in pairs upon opposite sides of the axis; a tool head or carrier for said cutter; means on said carrier for preventing longitudinal displacement of the cutter and for permitting lateral movement thereof in opposition to applied frictional resistance; and means for effecting relative movements of said chuck and carrier in a direction parallel with the axis of the chuck.

4. In a matrix coneholing machine such as described, the combination of the following elements, to-wit; a rotatory chuck and means for gaging longitudinally and laterally the position of an inserted blank within the chuck; a cutter provided with converging cutting edges symmetrically disposed on opposite sides of the axis of said cutter; a tool head or carrier for said cutter provided with means for frictionally opposing while permitting lateral displacement of the axis of the cutter relative to said head and for resisting longitudinal displacement; and means for effecting relative movements of the chuck and cutter in a direction parallel with the axis of the former.

5. In a matrix coneholing machine such as described, the combination of the following elements, to-wit; a rotatory chuck provided with end and side gaging surfaces for an inserted blank; a tool head or carrier guided to reciprocate parallel with the axis of the chuck; and a cutter provided with converging cutting edges symmetrically disposed on opposite sides of its axis, the shank of said cutter being flattened and received in a slotted bearing on the tool head or carrier.

6. A matrix coneholing machine such as described including, in combination, the following elements, to-wit; a rotatory chuck provided with side and end gages for an inserted blank; a tool head or carrier movable on guides parallel with the axis of the chuck and provided with an open bearing lying in a plane intersecting the prolonged axis of the chuck; a cutter provided with converging cutting edges symmetrically disposed on opposite sides of its axis and an angular section fitted loosely in said bearing; and means on said head or carrier engaging the cutter to prevent longitudinal motion of the latter with relation to said head or carrier.

7. A matrix coneholing machine such as described, containing, in combination, the following elements, to-wit; a rotatory chuck; a tool head guided to reciprocate in a plane parallel with the axis of the chuck and carrying a slide provided with a transverse opening or bearing, said slide moving in a plane substantially perpendicular to and intersecting the prolonged axis of the chuck; a cutter provided with a shank of polygonal section resting within and engaging opposite walls of the said bearing, the end of the cutter next the chuck being provided with converging cutting edges symmetrically disposed upon opposite sides of its axis; and means for resisting longitudinal movement of the cutter relatively to the head.

8. A matrix coneholing machine such as described including, in combination, the following elements, to-wit; a rotatory chuck equipped with side and end gages for an inserted blank; a tool carrier movable both transversely of and in a plane parallel with the axis of the chuck; a plurality of self-centering cutters arranged in succession in the line of the carrier's transverse movement, each cutter provided at one end with two converging cutting edges symmetrically disposed on opposite sides of its axis and having its opposite end or shank flattened on opposite sides transversely of the axis thereof; and a slide for each cutter mounted to reciprocate in bearings on the carrier in a direction perpendicular to the axis of the chuck and containing a bearing or opening extending transversely of the direction of motion of the slide upon the carrier, the flattened portion of the shank of each cutter fitting loosely in the open bearing of one of said slides.

9. A matrix coneholing machine such as described, including the following elements, in combination, to-wit; a rotatory chuck provided with means for gaging the position of an inserted blank; and a self-centering cutter mounted upon a tool holder or carrier movable parallel with the axis of the chuck.

10. In a matrix coneholing machine such as described, the combination of the following elements, to-wit; a rotatory chuck provided with end and side gaging devices for an inserted blank; a tool head or carrier movable both transversely and longitudinally of the axis of the chuck; a plurality of self centering cutters mounted upon said head for successive presentation; means for intermittingly advancing said head to present successive cutters in front of the chuck; means for longitudinally reciprocating the cutter so presented; and means for separately gaging or measuring the approach of each cutter toward the chuck.

11. In a matrix coneholing machine such as described, the combination of the following elements, to-wit; a chuck or blank holder; means for gaging the position of an inserted blank within the chuck; a self centering cutter comprising a shank frictionally confined in a holder, to permit lateral movement thereon, and a cutting point or end equipped with converging cutting edges symmetrically disposed on opposite sides of its axis; means for effecting a relative rotation of the chuck or blank holder and cutter; and means for effecting a relative reciprocation of said blank holder or chuck and cutter in a direction parallel with the axes of the cutter and blank.

12. In a matrix coneholing machine such as described, the combination of the following elements, to-wit; a rotatory chuck provided with end and side gages for an inserted blank; a feeding mechanism for delivering blanks to the chuck; and a reversing driving mechanism and one way stop for the chuck.

13. In a matrix coneholing machine such as described, the combination of the following elements, to-wit; a rotatory chuck provided with angular clamping jaws, an end gage, and a blank ejector; a blank feeding mechanism delivering to the chuck; and a reversing driving mechanism and one-way stop including reverse driving members, an intermediate clutch member, and a stop operating in conjunction with the engagement of one of said driving members to arrest the chuck.

14. In a matrix coneholing machine such as described, the combination of the following elements, to-wit; a rotatory spindle carrying a chuck the latter provided with a fixed jaw containing an angular gaging face, an opposed clamping jaw, and an end gage for the inserted blank; blank feeding devices delivering to said chuck; reversely driven members mounted upon the spindle; a movable clutch section coupled with the spindle and adapted to engage and couple either driven member with the spindle; and a stop mechanism for arresting the spindle in predetermined relation to the blank feeding devices, the same including a shoulder moving in unison with the spindle and a detent adapted to be interposed in the path of said shoulder.

15. In a matrix coneholing machine such as described, the combination of the following elements, to-wit; a rotatable chuck; a tool head or carrier guided to travel in two directions, the one transverse and the other longitudinal of the axis of the chuck; a slide mounted in guides on said holder and provided with an open bearing extending transversely of said guides; a cutter provided with converging peripheral cutting edges symmetrically disposed on opposite sides of its axis and with a flattened section adapted to engage opposite faces of the open bearing in the aforesaid slide; and means for sustaining the cutter against longitudinal movement in relation to said head or carrier.

16. In a matrix coneholing machine such as described the combination of the following elements, to-wit; a rotatable chuck; a tool head or carrier guided to move in two directions, the one transversely and the other in parallel with the axis of said chuck; a slide guided upon said tool head in a plane perpendicular to and intersecting the prolonged axis of the chuck, and provided with a bearing extending transversely of the guides for the slide; a cutter provided with an angular section loosely fitting said bearing and a pointed extremity formed by converging peripheral cutting edges symmetrically arranged on diametrically opposite sides of its axis; and a holder for said cutter engaging a bearing on the tool head.

17. In a matrix coneholing machine, the combination of the following elements, to-wit; a rotatable chuck; a slide movable transversely of the axis of the chuck; a tool head movable in guides on said slide in parallel with the axis of the chuck and provided with a plurality of tools arranged in series in the direction of movement of said slide; and a sectional locking bolt for said slide the same including an engaging section registering with V-notches in the slide and beveled on one side, and an actuating section engaging said side bevel to advance the engaging section and force the latter against the gaging wall of its guide.

18. In a matrix coneholing machine, such as described, the combination of the following elements, to-wit; a rotatory chuck; and a tool head movable transversely and longitudinally of the axis of the chuck and equipped with a series of self-centering cutters including a tapering roughing cutter, a drill and a tapering finishing cutter arranged in sequence transversely of the axis of the chuck.

19. In a matrix coneholing machine, the combination of the following elements, to-wit; a rotatable chuck; a tool head movable transversely and longitudinally of the axis of the chuck and provided with a series of self-centering cutters including a tapering roughing cutter, a drill and a tapering finishing cutter; means for intermittently advancing the tool head to present successive cutters in line with the chuck; and means for reciprocating the tool head.

20. In a matrix coneholing machine, the combination of the following elements, to-wit; a rotatable chuck; a tool head movable laterally and longitudinally of the axis of said chuck; two blank guides and an intermediate series of cutters mounted upon the tool head; supply and receiving galleys; a pusher for discharging a blank from the supply galley through one of said guides into the chuck; an ejector for discharging a finished blank from the chuck into the other of said guides; and an ejector for discharging the finished blank from the last named guide into the receiving galley.

21. In a matrix coneholing machine, the combination of the following elements, to-wit; a rotatable chuck; a tool head or carrier located in front of the chuck and movable transversely of the axis thereof; carrying and transferring guides with intermediate cutter or cutters serially disposed upon said carrier in the line of its travel past the chuck; a blank receptacle or supply galley and complemental pusher; a receiving receptacle or galley and complemental pusher; and an ejector for the chuck; the arrangement being such that the finished blank is discharged into the carrying guide when the latter registers with the chuck and as the tool head is shifted, to bring the transferring guide into register with the chuck and supply galley, the carrying chuck will register with the receiving galley so that a blank may be transferred by the pusher through said transferring guide to the chuck and the finished blank previously deposited in the carrying guide be discharged therefrom into the receiving galley.

22. In a matrix coneholing machine, the combination of the following elements, to-wit; a slide or support with means for intermittingly advancing the latter; a carrier mounted to reciprocate upon said slide in a direction transverse of the line of travel of the slide and in the intervals of rest between successive feed motions of the latter; and a sequence indicator or designator barring the advance of the carrier on the slide at the station or stations of rest of the latter occurring subsequent to a designated station and operated upon by the carrier at the completion of its forward movement at the designated station to remove the bar for the next succeeding station.

23. In a matrix coneholing machine, the combination of the following elements, to-wit; a slide or support provided with means for intermittingly advancing same; a tool carrier mounted to reciprocate upon said support, during the intervals of rest, in a direction transverse to the line of motion of the slide; and means under the control of said carrier for permitting the advance of the carrier at a designated station and barring its advance at subsequent stations, the completion of the advance movement of said carrier at the designated station operating to remove the barrier for the next succeeding station.

24. In a matrix coneholing machine, the combination of the following elements; to-wit; an intermittingly advancing support; a tool head mounted to reciprocate upon said support across the latter's line of motion; and a sequence indicator or designator controlling the movement of the tool head upon the slide provided with a plurality of channels, a pilot member carried by the tool head, and a movable slotted member, the arrangement being such that when the slotted member is adjusted to open one channel it bars subsequent channels and the passing of the pilot member through the open channel shifts the slotted member to open the next succeeding channel for the passage of said pilot member.

25. In a matrix coneholing machine, the combination of the following elements, to-wit; an intermittingly advancing slide or support; a reciprocatory tool head carried by said slide; and a sequence indicator or designator controlling successive advances of the tool head, the same including a pilot member carried by the tool head, a stationary member provided with a series of channels for the passage of said arm, and a movable slotted member provided with inclines on corresponding sides of its slots for engagement by the pilot, the passages in the slotted member being so proportioned and arranged relatively to the stationary channeled member that when one of its slots is in register with the complemental channel of the stationary member the other slots are out of register and the bar thus formed to the passage of the pilot is removed only when the tool head has completed its movement and shifted the slotted member through contact of the pilot with the incline.

26. In a matrix coneholing machine, the combination of the following elements, to-wit; an intermittingly advancing slide or support; a tool head mounted to reciprocate transversely of said slide; a pilot member carried by the tool head; and a sequence designator barring the advance of the tool head upon its support in all stages of the latter's adjustment save one and operated at the conclusion of the advance of the tool head in the designated stage of adjustment of the support to unbar or open the way for the advance of said tool-head at a succeeding stage of adjustment of the support.

27. In a matrix coneholing machine, the combination of the following elements, to-wit; an intermittingly movable slide or support; a reciprocatory tool head carried by said support and guided to move transversely of the latter's path; and a sequence designator or indicator barring the advance of the tool head at all stages of rest of the support save one and controlled by the tool-head, when advanced at the designated station, to unbar or open its path at the supports next succeeding station or stage of rest.

28. In a matrix coneholing machine, the combination of the following elements, to-wit; an intermitting movable support; a tool-head carried by said support and guided to reciprocate transversely of the latter's path of motion; and a sequence designator or indicator controlled by the tool-head in its movement upon the support, to designate the next stage in the adjustment of the support at which the advance of the tool-head is permitted.

29. In a matrix coneholing machine, the combination of the following elements, to-wit; an intermittingly movable support, a tool-head carried by said support and guided to reciprocate thereon transversely of its path of motion; a lock-out for the tool head permitting the advance of the latter at one only of the series of stations occupied by the support; and means controlled by the tool head when advanced to an extreme position for automatically actuating the lockout devices to remove the barrier corresponding with a next succeeding station.

30. In a coneholing machine, the combination of the following elements, to-wit; a rotatory chuck; a slide or support movable laterally of the axis of said chuck; a tool head mounted upon said support to reciprocate longitudinally of the axis of the chuck and provided with a plurality of tools serially disposed in the path of movement of the support; and a sequence designator controlled by the movement of the tool head to designate successive stages in the movement of the slide.

31. In a coneholing machine, the combination of the following elements, to-wit; a chuck; a slide or support movable transversely of the axis of said chuck; a tool head carried by said support, adapted to reciprocate transversely of the latter's path of movement and equipped with a plurality of tools serially disposed in the line of movement of the support; means for gaging the approach of the tool head toward the chuck as each cutter is presented to the latter; and a sequence designator controlled by the tool head and operating to prevent the advance of the tool head when any tool is presented to the chuck unless the preceding tool of the series shall have completed its stroke.

32. In a coneholing machine, the combination of the following elements, to-wit; a blank holder or chuck; a plurality of tools; means for presenting successive tools to the chuck and advancing the same into contact with the blank; and an automatic sequence designator operating to lock out or prevent the advance of subsequent tools until the precedent tool shall have completed its advance movement.

33. In a coneholing machine, the combination of the following elements, to wit; a blank holder or chuck; a tool head provided with a plurality of tools and movable both laterally and longitudinally of said chuck to present and advance successive tools; actuating devices for the tool head including a driving clutch; and a detector controlling said clutch and in turn controlled through its engagement with one of said tools during the retrograde or withdrawal movement of the latter.

34. In a coneholing machine, the combination of the following elements, to-wit; a blank holder or chuck; a tool holder movable longitudinally of said chuck and provided with a cutting tool; actuating devices including a driving clutch for effecting the advance of said tool head, and a detector or feeler coupled with said clutch and engaging the cutter as the latter is withdrawn from the chuck, said detector or feeler being coupled with the clutch to open the latter.

35. In a coneholing machine, the combination of the following elements, to-wit; a blank holder or chuck; a cutter carrying tool head movable toward and from the blank holder; actuating devices for the tool head, including a driving clutch; and a detector mechanism controlling said driving clutch and including a movable feeler, a supporting latch, and means coupled with the tool head for engaging the latch to release the feeler.

36. In a coneholing machine, the combination of the following elements, to-wit; a blank holder or chuck; a tool head movable longitudinally and laterally of the axis of the chuck and provided with a plurality of cutters serially arranged for successive presentation to the chuck; actuating devices for the tool-head including a driving clutch; a feeler supported to engage a tool when in alinement with the chuck and coupled with the controlling devices of the driving chuck; a restraining latch for the feeler; and a latch engaging member coupled with the tool head and engaging the feeler to actuate the clutch controlling devices when the cutter passes from engagement with the feeler.

37. In a coneholing machine, the combination of the following elements, to-wit; a rotatory chuck; a cutter movable toward and from said chuck; actuating devices for rotating the chuck and reciprocating the cutter, the same including a driving clutch and controlling devices therefor; and a detector coupled with said clutch controlling devices and acting in conjunction with the cutter to open the clutch.

38. In a coneholing machine, the combination of the following elements, to-wit; a rotatory chuck; a cutter mounted to reciprocate relatively to said chuck; actuating devices including a driving clutch and controlling devices therefor; and a broken-tool detector coupled with said driving clutch controlling devices and provided with a feeler movable transversely of the cutter.

39. In a coneholing machine, the combination of the following elements, to-wit; a chuck; a drill; actuating devices for effecting relative movements of said chuck and drill, the same including a driving clutch; and a broken drill detector controlling said driving clutch.

40. In a coneholing machine, the combination of the following elements, to-wit; a chuck; a drill; actuating devices for alternately effecting the approach and separation of said chuck and drill, the same including a normally closed driving clutch; and means for opening said clutch controlled by a movable feeler and maintained in inoperative condition by the engagement of said feeler with a portion of the drill.

41. In a coneholing machine, the combination of the following elements, to-wit; a chuck; a drill; actuating devices for effecting a relative movement of said chuck and drill, the same including a driving clutch normally closed and provided with opening means; and actuating devices for said opening means including a controlling member or feeler movable into the path of the drill as the latter is retracted.

42. In a coneholing machine, the combination of the following elements, to-wit; a two-way movable tool head carrying a plurality of tools, the latter serially arranged in the direction of one of said motions; automatic actuating devices for intermittingly advancing the tool head in one direction and for reciprocating the same in the other direction, said actuating devices including a driving clutch and actuating and controlling means therefor provided with a movable member coupled with the clutch actuating devices; a link coupled with said movable member and provided with a feeler; a latch for the link; and a pin carried by the tool head in position to actuate the latch and engage the link.

43. In a coneholing machine, the combination of the following elements, to-wit; a two-way movable tool head; actuating devices for intermittingly advancing the tool head in one direction and for reciprocating it in the other direction, said actuating devices being provided with a driving clutch; and controlling devices for said clutch including a link, a feeler coupled with the latter, a latch, and a pin coupled with the tool head for releasing the latch and engaging the link.

44. In a coneholing machine, the combination of the following elements, to-wit; a two-way movable tool head carrying a tool; actuating devices for effecting intermitting advances of the tool head in one direction and reciprocatory movements in the other, said devices including a driving clutch and controlling means therefor; a detector coupled with the clutch controlling means and movable across the path of the tool a moving member for engaging said detector; a latch for restraining the advance of the detector, and means controlled by the tool head for actuating said latch.

45. In a coneholing machine, the combination of the following elements, to-wit; a chuck; a two-way movable tool head carrying a plurality of tools; and a sequence designator controlled by the movements of the tool head.

46. In a coneholing machine, the combination of the following elements, to-wit; a two-way movable tool head carrying a plurality of tools serially disposed in one line of motion of said tool head; and a sequence designator controlled by the movements of the tool head and operating to determine the order of presentation of said tools and to render the advance of the tool head when a given tool is presented dependent upon the completion of its advance in connection with the presentation of the preceding tool in the series.

47. In a coneholing machine, the combination of the following elements, to-wit; a chuck provided with a blank ejector; a two-way movable tool head provided with a plurality of cutters and a plurality of guides, said cutters and guides disposed in series in one line of movement of the tool head; a supply channel and pusher, the latter delivering through one of the guides to the chuck, and a receiving channel and opposed pusher, the latter delivering a contained blank from the other guide to the receiving galley.

48. In a coneholing machine, the combination of the following elements, to-wit; a chuck provided with an ejector; a pusher opposite and in alinement with said chuck; an intermittently advancing tool head movable transversely of the axis of the chuck between the latter and said pusher and provided with two blank receiving guides and intermediate tools the whole disposed in series in the direction of motion of said tool head; supply and receiving channels or galleys located to one side of the tool head, each of said galleys adapted to register with one of said blank guides; and a pusher opposite the receiving channel.

49. In a coneholing machine, the combination of the following elements, to-wit; a rotatory spindle; a reversing drive including two driving members, an intermediate movable clutch member, and yieldable means for advancing said clutch member into engagement with one of said driving members; and actuating devices for said clutch member including a driving member provided with spaced contacts, and a driven member coupled with the clutch member and provided with contacts intermediate and spaced at less distance apart than those of the driving member.

50. In a coneholing machine, the combination of the following elements, to-wit; a rotatory chuck; a two-way movable tool-head provided with a plurality of cutters and blank guides serially arranged transversely of the axis of the chuck; an ejector and opposing pusher for the chuck; supply and receiving galleys with coöperating pushers; and actuating devices for the aforesaid elements including suitable transmitting members deriving motion from a single cam shaft.

51. In a coneholing machine, the combination of the following elements, to wit; a rotatory spindle carrying a chuck; means for opening and closing said chuck; means for temporarily arresting rotation of said spindle; a two-way movable tool-head provided with a plurality of cutters serially arranged for successive presentation to the chuck; and actuating devices for the aforesaid members, the same including a main driving member or pulley, a clutch, a driven shaft provided with a series of cams, transmitting devices intermediate said cams and said performing members, and a reversing drive for the chuck spindle provided with separate driving members whereof one is coupled with the main driving member and the other is independently driven, and means controlled from the cam shaft for coupling alternate driving members with the spindle.

52. In a coneholing machine, the combination of the following elements, to-wit; a chuck; a blank guide; a pusher for transferring a blank from said guide to the chuck; means for opening and closing the chuck; and means controlled by the pusher and operating in conjunction with the chuck closing devices for preventing the closing of the chuck until the feeding stroke of the pusher is completed.

53. In a coneholing machine, the combination of the following elements, to-wit; a rotatory chuck; reciprocatory means for delivering a blank to the chuck; means for alternately opening and closing the chuck; means for holding the chuck in a predetermined fixed position with relation to the blank delivery devices while the chuck is opened; and means controlled by the blank delivery devices for preventing the closing of the chuck prior to the delivery of the blank.

54. In a coneholing machine, the combination of the following elements, to-wit; a rotatory chuck; a reciprocatory blank feeder for said chuck; means for alternately opening and closing the chuck; actuating devices including a driving clutch and operating devices therefor; and means controlled by the blank feeder and in turn controlling the clutch operating devices to arrest the actuating devices upon the failure of the feeder to complete its delivery movement.

55. In a coneholing machine, the combination of the following elements, to-wit; a rotatory chuck; a blank feeder; chuck opening and closing means; actuating devices including a driving clutch; and means controlled by the blank feeder operated by the actuating devices and operating upon the clutch to open the latter upon the failure of the blank feeder to complete its delivery movement.

56. In a coneholing machine, the combination of the following elements, to-wit; a rotatory chuck; a reciprocatory pusher delivering to the chuck; chuck opening and closing devices; a latch for engaging said movable member to hold the clutch open; and connections intermediate said latch and pusher for effecting the withdrawal of the latch upon the completion of the delivery movement of the pusher.

57. In a coneholing machine, the combination of the following elements, to-wit; a rotatory chuck; a reciprocatory feeder delivering to said chuck; chuck opening and closing devices, including a driving and driven member; a latch for engaging said driven member; actuating devices including a driving clutch provided with operating devices for opening and closing said clutch; a movable member coupled with the clutch operating devices; and a transmitting member coupled with said latch and driving member for coupling the latter with the clutch-operating movable member to open the driving clutch upon the arrest of the pusher during its feeding movement before the completion thereof.

58. In a coneholing or similar machine, provided with opposed relatively rotatable and axially movable work and tool holders, and in combination therewith a cutting tool provided with a plurality of converging cutting edges symmetrically disposed on opposite sides of its axis, and holding means mounted upon the holder and engaging the tool near the base of its cutting section, said holding means being adapted to permit a bodily lateral movement of the tool in intersecting planes parallel with its axis and operable through the rotation of the tool to interpose frictional resistance to said lateral displacement.

JOHN SELLERS BANCROFT.
MAURITZ C. INDAHL.

Witnesses:
MORTIMER A. JONES,
FRED WEINDEL, Jr.

---

Copies of this patent may be obtained for five cents each, by addressing the "Commissioner of Patents, Washington, D. C."